(12) United States Patent
Lee et al.

(10) Patent No.: US 10,777,193 B2
(45) Date of Patent: Sep. 15, 2020

(54) SYSTEM AND DEVICE FOR SELECTING SPEECH RECOGNITION MODEL

(71) Applicant: Samsung Electronics Co., Ltd., Gyeonggi-do (KR)

(72) Inventors: Jung In Lee, Gyeonggi-do (KR); Min Seok Kwon, Gyeonggi-do (KR); In Jong Rhee, Gyeonggi-do (KR); Chang Heon Lee, Seoul (KR); Seok Yeong Jung, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 167 days.

(21) Appl. No.: 16/019,740

(22) Filed: Jun. 27, 2018

(65) Prior Publication Data
US 2018/0374476 A1  Dec. 27, 2018

(30) Foreign Application Priority Data

Jun. 27, 2017  (KR) .......................... 10-2017-0081420

(51) Int. Cl.
| | |
|---|---|
| *G10L 15/19* | (2013.01) |
| *G06F 3/16* | (2006.01) |
| *G10L 15/22* | (2006.01) |
| *G10L 15/183* | (2013.01) |
| *G10L 15/32* | (2013.01) |
| *G10L 15/00* | (2013.01) |

(52) U.S. Cl.
CPC .............. *G10L 15/19* (2013.01); *G06F 3/167* (2013.01); *G10L 15/183* (2013.01); *G10L 15/22* (2013.01); *G10L 15/32* (2013.01); *G10L 15/005* (2013.01)

(58) Field of Classification Search
None
See application file for complete search history.

(56) References Cited

U.S. PATENT DOCUMENTS

| | | | | |
|---|---|---|---|---|
| 6,385,583 B1 * | 5/2002 | Ladd | .................. | H04M 3/4938 379/88.01 |
| 7,072,838 B1 * | 7/2006 | Ghosh | ..................... | G10L 15/19 704/257 |

(Continued)

FOREIGN PATENT DOCUMENTS

| | | |
|---|---|---|
| KR | 10-0644814 B1 | 11/2006 |
| KR | 10-2016-0107735 A | 9/2016 |

*Primary Examiner* — Thuykhanh Le
(74) *Attorney, Agent, or Firm* — Cha & Reiter, LLC.

(57) ABSTRACT

A system includes network interface, processor operatively connected to the network interface, and memory operatively connected to the processor. The memory stores a plurality of language models of a first language. The plurality of language models be different from one another. Each of the plurality of language models is provided for speakers whose native language is different from the first language. The memory further stores instructions that cause the processor to receive a user's speech data associated with a plurality of sample texts from an external electronic device, to perform automatic speech recognition (ASR) on the speech data using the plurality of language models, to select one language model from the plurality of language models based on results from the performed ASR, and to use the selected one language model as a default language model for speech of the user.

11 Claims, 18 Drawing Sheets

(56) References Cited

U.S. PATENT DOCUMENTS

| | | | |
|---|---|---|---|
| 7,792,673 B2 | 9/2010 | Oh et al. | |
| 8,306,818 B2* | 11/2012 | Chelba | G06F 40/216 704/236 |
| 8,606,576 B1* | 12/2013 | Barr | G10L 15/22 704/235 |
| 9,275,635 B1* | 3/2016 | Beaufays | G10L 15/32 |
| 9,443,519 B1* | 9/2016 | Bakshi | G06F 40/30 |
| 9,589,564 B2 | 3/2017 | Sharifi | |
| 9,679,563 B2* | 6/2017 | Lee | G06F 1/3287 |
| 2004/0203660 A1* | 10/2004 | Tibrewal | H04M 3/4286 455/414.1 |
| 2007/0106514 A1 | 5/2007 | Oh et al. | |
| 2008/0040099 A1* | 2/2008 | Wu | G06F 40/263 704/9 |
| 2008/0167871 A1* | 7/2008 | Kim | G10L 15/22 704/246 |
| 2010/0180202 A1* | 7/2010 | Del Valle Lopez | G06F 3/048 715/728 |
| 2010/0235167 A1* | 9/2010 | Bourdon | G10L 15/063 704/231 |
| 2011/0295590 A1* | 12/2011 | Lloyd | G10L 15/30 704/8 |
| 2012/0078629 A1* | 3/2012 | Ikeda | G10L 15/1807 704/235 |
| 2012/0109632 A1* | 5/2012 | Sugiura | G10L 15/20 704/3 |
| 2012/0253823 A1* | 10/2012 | Schalk | G08G 1/096877 704/270.1 |
| 2013/0185072 A1* | 7/2013 | Huang | G10L 15/22 704/246 |
| 2013/0191126 A1* | 7/2013 | Thambiratnam | G10L 15/187 704/245 |
| 2013/0238336 A1* | 9/2013 | Sung | G10L 15/005 704/255 |
| 2015/0039299 A1* | 2/2015 | Weinstein | G10L 15/16 704/202 |
| 2015/0039305 A1* | 2/2015 | Huang | G10L 15/10 704/233 |
| 2015/0112675 A1* | 4/2015 | Zhang | G10L 15/187 704/235 |
| 2015/0221305 A1* | 8/2015 | Sharifi | G10L 15/32 704/235 |
| 2016/0063998 A1* | 3/2016 | Krishnamoorthy | G10L 15/02 704/254 |
| 2017/0140756 A1 | 5/2017 | Sharifi | |
| 2017/0229121 A1* | 8/2017 | Taki | G10L 15/22 |
| 2018/0107650 A1* | 4/2018 | Calvo | G06F 40/263 |
| 2018/0277100 A1* | 9/2018 | Cassagne | G06N 3/08 |
| 2018/0300030 A1* | 10/2018 | Master | G06F 40/263 |
| 2018/0366110 A1* | 12/2018 | Hashem | G10L 15/183 |

* cited by examiner

SYSTEM AND DEVICE FOR SELECTING SPEECH RECOGNITION MODEL

CROSS-REFERENCE TO RELATED APPLICATION(S)

This application is based on and claims priority under 35 U.S.C. § 119 to Korean Patent Application No. 10-2017-0081420, filed on Jun. 27, 2017, in the Korean Intellectual Property Office, the disclosure of which is incorporated by reference herein its entirety.

BACKGROUND

1. Field

The present disclosure generally relates to technology for selecting among various speech recognition models.

2. Description of Related Art

When utilizing various electronic devices such as a mobile device or a display device, the user may enter a user command by using tools such as a keyboard, or a remote controller. Recently, as the input methods have diversified, electronic devices have included speech recognition capabilities so as to allow voice commands.

As such, an electronic device may use one of various speech recognition models for the purpose of converting the user's speech to text data. Generally, speech recognition models may convert voice to text by analyzing the pronunciation, intonation, etc. of the speech.

The above information is presented as background information only to assist with an understanding of the present disclosure. No determination has been made, and no assertion is made, as to whether any of the above might be applicable as prior art with regard to the present disclosure.

SUMMARY

Generally, in the speech recognition modules described above, a different speech recognition model may be provided for each language. However, the speech recognition model may also be trained by using the intonations of a native speaker. For example, the speech recognition model for recognizing American English may be trained by the intonations of a native American English speaker.

However, when the user is not a native speaker, his or her intonations may be different from that of the native speaker. In this case, the electronic device may not precisely recognize the user's speech.

Aspects of the present disclosure are to address at least the above-mentioned problems and/or disadvantages and to provide at least the advantages described below. Accordingly, an aspect of the present disclosure is to provide a method of recognizing the user's speech using the speech recognition model corresponding to the user's pronunciation or intonation.

In accordance with an aspect of the present disclosure, a system may include at least one network interface, at least one processor operatively connected to the network interface, and at least one memory operatively connected to the processor. The memory may store a plurality of language models of a first language. The plurality of language models may be different from one another. Each of the plurality of language models may be provided for speakers whose native language is different from the first language. The memory may further store instructions that, when executed, cause the processor to receive a user's speech data associated with a plurality of sample texts from an external electronic device displaying a user interface including the plurality of sample texts, where the plurality of sample texts includes words, phrases, and/or sentences, to perform automatic speech recognition (ASR) on the speech data, using the plurality of language models, to select one language model from the plurality of language models based on results from the ASR, and to use the selected one language model as a default language model for speech of the user.

In accordance with another aspect of the present disclosure, an electronic device may include a housing, a touchscreen display disposed inside the housing and exposed through a first portion of the housing, a microphone disposed inside the housing and exposed through a second portion of the housing, a wireless communication circuit disposed inside the housing, a processor disposed inside the housing and operatively connected to the touchscreen display, the microphone, and the wireless communication circuit, and a memory disposed inside the housing and operatively connected to the processor. The memory may store a plurality of language models of a first language. The plurality of language models may be different from one another. Each of the plurality of language models may be provided for speakers whose native language is different from the first language. The memory further stores instructions that, when executed, cause the processor to display a plurality of sample texts on the touchscreen display, to receive, through the microphone, a plurality of a user's speeches each associated with one of the plurality of sample texts, to transmit data of the plurality of the user's speeches to an external server through the wireless communication circuit, to receive results from ASR performed on the data of the plurality of the user's speeches from the external server through the wireless communication circuit, to select one language model from the plurality of language models based on the received results from the ASR, and to use the selected one language model as a default language model for speech of the user.

In accordance with another aspect of the present disclosure, an electronic device may include a housing, a touchscreen display disposed inside the housing and exposed through a first portion of the housing, a microphone disposed inside the housing and exposed through a second portion of the housing, a wireless communication circuit disposed inside the housing, a processor disposed inside the housing and operatively connected to the touchscreen display, the microphone, and the wireless communication circuit, and a memory disposed inside the housing and operatively connected to the processor. The memory may store a plurality of language models of a first language. The plurality of language models may be different from one another. Each of the plurality of language models may be provided for speakers whose native language is different from the first language. The memory may further store instructions that, when executed, cause the processor to display a plurality of sample texts on the touchscreen display, to receive, through the microphone, a plurality of a user's speeches each associated with one of the plurality of sample texts, to transmit data of the plurality of the user's speeches to an external server through the wireless communication circuit, and to transmit the plurality of language models to the external server. After transmitting the data of the plurality of the user's speeches and the plurality of language models, the instructions may cause the external server to perform ASR on the data of the plurality of the user's speeches using the plurality of language models, to select one language model from the plurality of language models based on results from the ASR, and to use the selected one language model as a default language model for speech of the user.

In accordance with another aspect of the present disclosure, a system may include at least one network interface, at least one processor operatively connected to the network interface, and at least one memory operatively connected to the processor. The memory may store a plurality of language models of a first language. The plurality of language models may be different from one another. Each of the plurality of language models may be provided for speakers whose native language is different from the first language. The memory may further store instructions that, when executed, cause the processor to provide a user interface including a plurality of samples including words, phrases, and/or sentences, to receive a user's speech data associated with the plurality of samples, to perform ASR on the speech data by using the plurality of language models, to select one language model from the plurality of language models based on the results from the ASR, and to use the selected language model as a default speech recognition model for speech of the user.

According to various embodiments of the present disclosure, it is possible to select and use a particular speech recognition language model using a user's speech, thereby improving the accuracy of speech recognition.

Furthermore, according to various embodiments of the present disclosure, the personalized speech recognition language model may be selected by using the user's speech or the user's personalization information.

In addition, a number of other features directly or indirectly understood through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the present disclosure will be described with reference to accompanying drawings. However, those of ordinary skill in the art will recognize that various modifications, equivalents, and/or alternatives on the various embodiments described herein can be made without departing from the scope and spirit of the present disclosure.

Prior to describing an embodiment of the present disclosure, an integrated intelligent system to which an embodiment of the present disclosure may be applied will be described.

Figure 1:
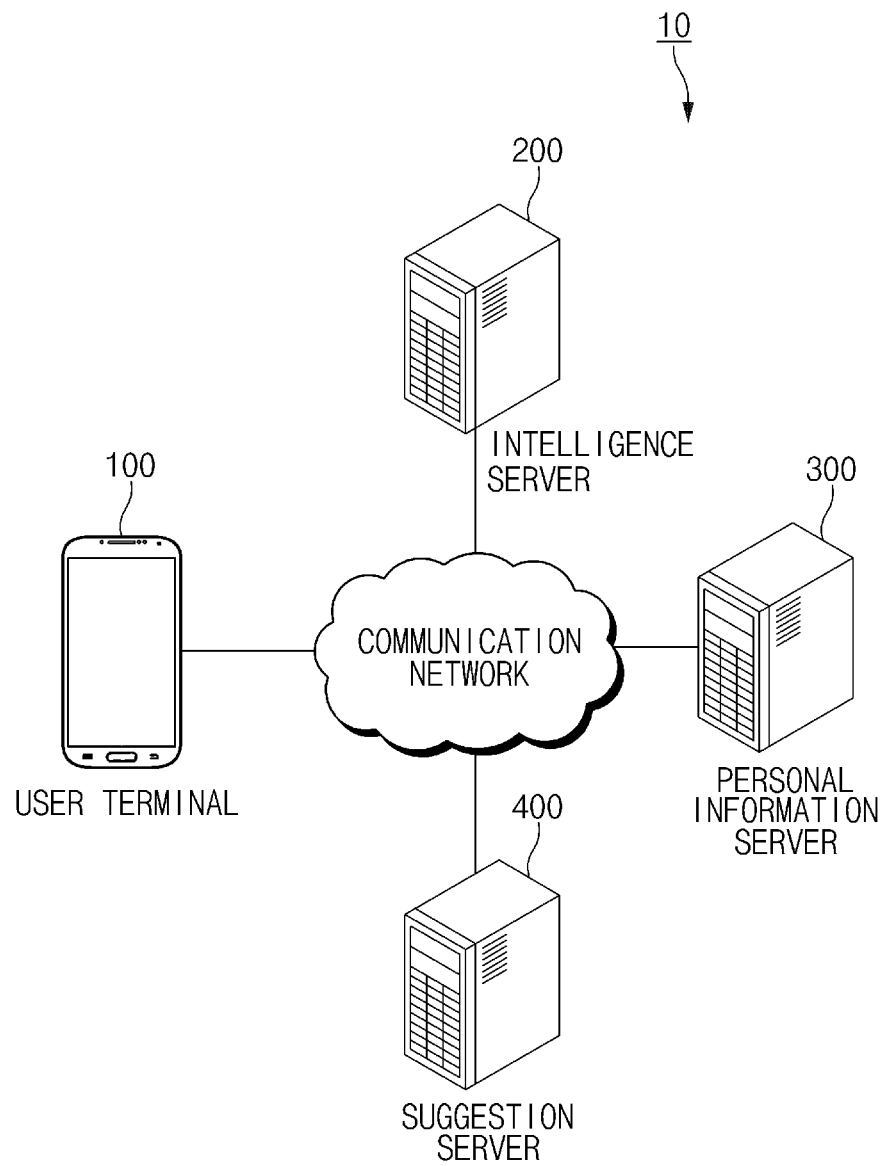
FIG. 1 is a schematic diagram illustrating an integrated intelligent system, according to an embodiment of the present disclosure.

FIG. 1 is a schematic diagram illustrating an integrated intelligent system, according to an embodiment of the present disclosure.

Referring to FIG. 1, the integrated intelligent system 10 may include a user terminal 100, an intelligence server 200, a personal information server 300, and/or a suggestion server 400.

The user terminal 100 may provide services for the user through various apps (or an application programs) (e.g., an alarm app, a message app, a picture (gallery) app, or the like) stored in the user terminal 100. The user terminal 100 may execute and operate an app through an intelligent app (or a speech recognition app) stored in the user terminal 100. For example, the user may use the speech recognition app and input a voice command "execute alarm app." Upon receiving the voice command, the speech recognition app may execute the alarm app. The user terminal 100 may also receive a user input for executing an action. For example, the user input may be received through a physical button, a touch pad, a voice input, a remote input, etc. According to an embodiment, the user terminal 100 may be various types of terminal devices or electronic devices connected with Internet, such as mobile phones, smartphones, personal digital assistants (PDA), notebook computers, etc.

In other words, the user terminal 100 may receive the user's speech as user input. The user terminal 100 may receive the user's speech and may generate a command for operating an app based on the user's speech. As such, the user terminal 100 may operate the app by using the user's voice commands.

The intelligence server 200 may receive a voice input of the user from the user terminal 100 over a communication network and may convert the voice input to text data. In an embodiment, the intelligence server 200 may generate or select a path rule based on the text data. The path rule may include information about an action or an operation for performing a function of the app specified by the voice input. Also, the path rule may include information about a parameter necessary to perform the action. In addition, the path rule may include the order of the action. The user terminal 100 may receive the path rule, may select the app corresponding to the path rule, and may execute the action included in the path rule in the selected app.

Generally, the term "path rule" of the present disclosure may mean, but not limited to, the sequence of states which allows the electronic device to perform the task requested by the user. The path rule may include information about the sequence of the states. For example, the task may be a certain action that the intelligent app is capable of providing, such as the generation of a calendar event, the transmission of a picture to a desired recipient, or the provision of weather information. The user terminal 100 may perform the task by sequentially executing the sequence of states.

According to an embodiment, the path rule may be provided or generated by an artificial intelligent (AI) system. The artificial intelligent system may be a rule-based system, or may be a neural network-based system (e.g., a feedforward neural network (FNN) or a recurrent neural network (RNN)). Alternatively, the artificial intelligent system may be a combination of the above-described systems or an artificial intelligent system that is different from the above-described system. According to an embodiment, the path rule may be selected from a set of predefined path rules or may be generated in real time in response to the user request (i.e. the voice input).

According to an embodiment, the user terminal 100 may execute the action and may display a screen corresponding to the result of the action in its display. According to another embodiment, the user terminal 100 may execute the action and may not display the result. The user terminal 100 may execute a plurality of actions and may display only the result of some of the actions. For example, the user terminal 100 may display only the result of the last action in the plurality of actions. In another example, the user terminal 100 may not display the results automatically and may display the results only after receiving a user input to display the results.

The personal information server 300 may include a database in which user information is stored. For example, the personal information server 300 may receive the user information (e.g., context information, information about execution of apps, etc.) from the user terminal 100 and may store the user information in the database. The intelligence server 200 may receive the user information from the personal information server 300 over the communication network so as to generate the above-described path rules based on the user information. According to an embodiment, the user terminal 100 may receive the user information from the personal information server 300 over the communication network, and may use the user information as information for managing the database.

The suggestion server 400 may include a database storing information about functions in the user terminal 100, information related to the explanation of various functions of an application, and/or functions that may be provided by the user terminal 100. For example, the suggestion server 400 may include a database associated with functions that the user utilizes by receiving the user information of the user terminal 100 from the personal information server 300. The user terminal 100 may receive information about the function to be provided from the suggestion server 400 over the communication network and may provide the information to the user.

Figure 2:
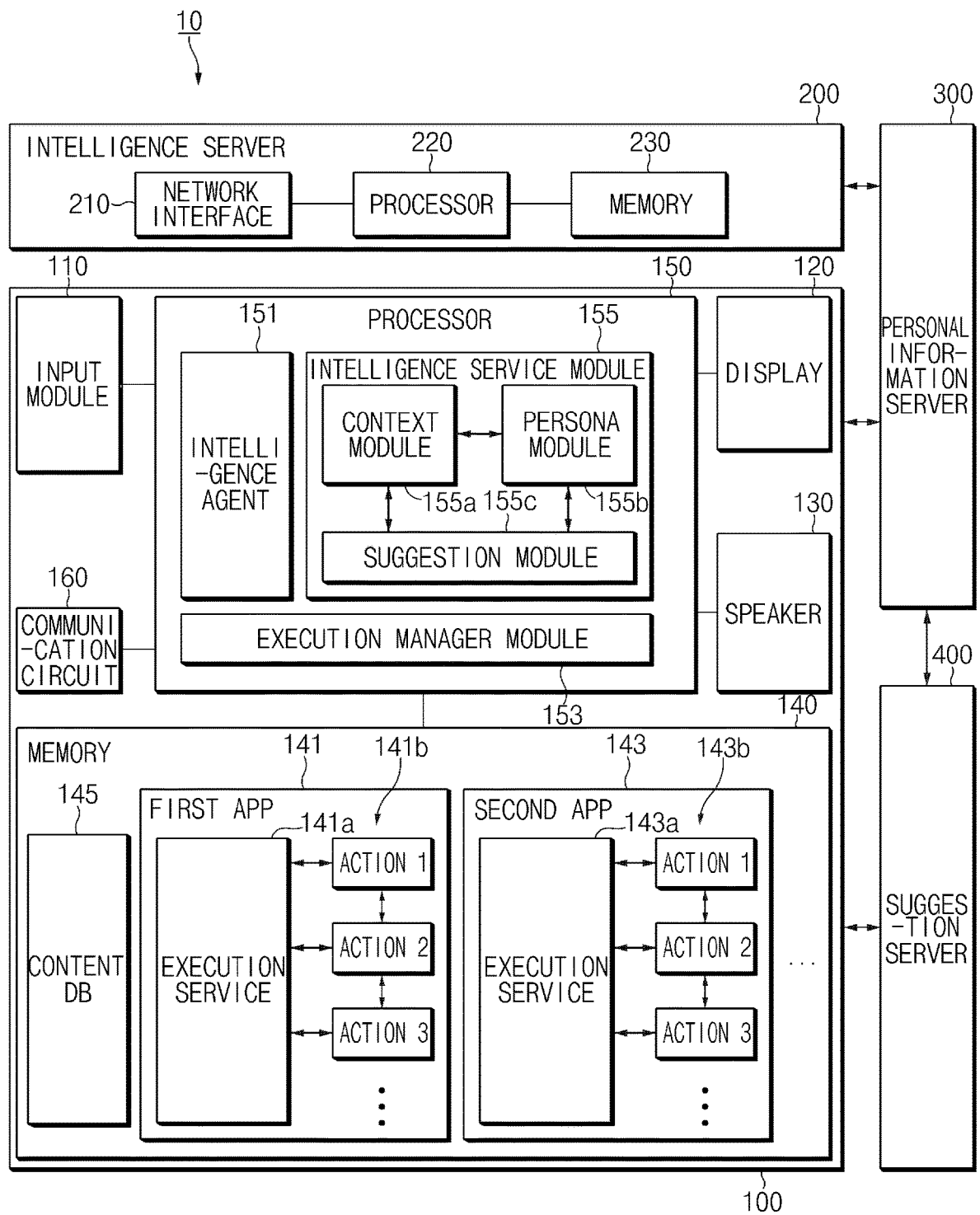
FIG. 2 is a block diagram illustrating a user terminal of an integrated intelligent system, according to an embodiment of the present disclosure.

FIG. 2 is a block diagram illustrating a user terminal of an integrated intelligent system, according to an embodiment of the present disclosure.

Referring to FIG. 2, the user terminal 100 may include an input module 110, a display 120, a speaker 130, a memory 140, or a processor 150. The user terminal 100 may further include a housing, and the illustrated components of the user terminal 100 may be housed in the housing.

According to an embodiment, the input module 110 may receive user inputs from the user. For example, the input module 110 may receive user inputs from connected external devices such as a keyboard or a headset. In another example, the input module 110 may include a touch panel coupled to the display 120, which renders the display 120 to be a touchscreen. In yet another example, the input module 110 may include one or more hardware or physical keys exposed through the housing of the user terminal 100.

According to an embodiment, the input module 110 may include a microphone that is capable of receiving the speech of the user as voice signals. For example, the input module 110 may include a speech input system and may receive the speech of the user as voice signals through the speech input system.

According to an embodiment, the display 120 may display images, videos, and/or execution screens of applications of the user terminal. For example, the display 120 may display graphic user interfaces (GUIs) of apps of the user terminal.

According to an embodiment, the speaker 130 may output voice signals. For example, the speaker 130 may output voice signals generated by the user terminal 100.

According to an embodiment, the memory 140 may store a plurality of apps (or application programs) 141 and 143. The plurality of apps 141 and 143 stored in the memory 140 may be selected and executed based on user input.

According to an embodiment, the memory 140 may include a database storing information necessary to recognize the user input. In addition, the memory 140 may include a log database storing log information and a persona database capable of storing user information.

According to an embodiment, the plurality of apps 141 and 143 stored in the memory 140 may be loaded by an execution manager module 153 of the processor 150 so that the apps can be executed. The plurality of apps 141 and 143 may include execution service modules 141a and 143a which can perform various functions. For example, the plurality of apps 141 and 143 may perform a plurality of actions (e.g., a sequence of states) 141b and 143b through execution service modules 141a and 143a for the purpose of performing functions. That is, the execution service modules 141a and 143a may be activated by the execution manager module 153, and then may execute the plurality of actions 141b and 143b.

According to an embodiment, when the actions 141b and 143b of the apps 141 and 143 are executed, execution state screens according to the execution of the actions 141b and 143b may be displayed in the display 120. For example, the execution state screens may be screens displaying the results of the actions 141b and 143b when the actions are completed. In another example, the execution state screens may be screens prompting the user to enter additional input for the completion of the actions 141b and 143b.

According to an embodiment, the execution service modules 141a and 143a may execute the actions 141b and 143b depending on the above-described path rules. For example, the execution service modules 141a and 143a may be activated by the execution manager module 153, may receive an execution request from the execution manager module 153 that is based on a path rule, and may execute functions of the apps 141 and 143 by performing the actions 141b and 143b based on the execution request. When the execution of the actions 141b and 143b is completed, the execution service modules 141a and 143a may transmit the results to the execution manager module 153.

According to an embodiment, the plurality of the actions 141b and 143b may be sequentially executed. When the execution of one action (e.g., action 1 of the first app 141 or action 1 of the second app 143) is completed, the execution service modules 141a and 143a may open the next action (e.g., action 2 of the first app 141 or action 2 of the second app 143) and may transmit the results of the first action to the execution manager module 153. Here, "opening" an action means changing the state of the action to an executable state or to prepare the execution of the action. In other words, when the action is not opened, it may be not executed. When the results of the first action are received, the execution manager module 153 may transmit the execution request associated with the next action (e.g., action 2 of the first app 141 or action 2 of the second app 143) to the execution service modules 141a and 143a. According to an embodiment, the plurality of apps 141 and 143 may be sequentially executed. For example, after receiving the results of the last action (e.g., action 3 of the first app 141) of the first app 141, the execution manager module 153 may transmit the execution request of the first action (e.g., action 1 of the second app 143) of the second app 143 to the execution service module 143a.

According to an embodiment, when the plurality of the actions 141b and 143b are executed in the apps 141 and 143, result screens from the execution of the actions 141b and 143b may be displayed in the display 120. Alternatively, not all of the result screens may be displayed in the display 120.

According to an embodiment, the memory 140 may store an intelligent app (e.g., a speech recognition app) operating in conjunction with an intelligence agent 151 included in the processor 150. The intelligent app may receive and process the speech of the user as voice signals. According to an embodiment, the intelligent app may be initiated or prompted by a specific input (e.g., an input through a hardware key, an input through a touchscreen, or a specific voice input) input through the input module 110.

According to an embodiment, the processor 150 may control overall actions of the user terminal 100. For example, the processor 150 may control the input module 110 to receive user input. The processor 150 may control the display 120 to display content. The processor 150 may control the speaker 130 to output sounds or voice signals. The processor 150 may control the memory 140 to read or store information. The processor 150 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the processor 150 may include the intelligence agent 151, the execution manager module 153, and/or an intelligent service module 155. In an embodiment, the processor 150 may drive the intelligence agent 151, the execution manager module 153, and/or the intelligence service module 155 by executing instructions stored in the memory 140. Modules described in various embodiments of the present disclosure may be implemented by hardware and/or by software. In various embodiments of the present disclosure, it is understood that actions executed by the intelligence agent 151, the execution manager module 153, and/or the intelligence service module 155 are actions executed by the processor 150.

According to an embodiment, the intelligence agent 151 may generate a command for operating an app (e.g. the app 141) based on voice signal received as user input. According to an embodiment, the execution manager module 153 may receive the generated command from the intelligence agent 151, and may select and execute the app 141. According to an embodiment, the intelligence service module 155 may manage information of the user and may use the information of the user to process the user input.

The intelligence agent 151 may transmit and process the voice signal received through the input module 110 to the intelligence server 200.

According to an embodiment, before transmitting the voice signal to the intelligence server 200, the intelligence agent 151 may pre-process the user input. According to an embodiment, to pre-process the user input, the intelligence agent 151 may include an adaptive echo canceller (AEC) module, a noise suppression (NS) module, an end-point detection (EPD) module, and/or an automatic gain control (AGC) module. The AEC may remove unwanted echoes in the voice signal. The NS module may suppress background noise in the voice signal. The EPD module may detect the end-point of the user speech in the voice signal so that the intelligence server 200 can readily determine the part of the voice signal that contains the user's speech. The AGC module may adjust the volume of the voice signal so that the voice signal can be properly processed by the intelligence server 200. According to an embodiment, the intelligence agent 151 may include execute all of the pre-processing above for maximum performance. However, in another embodiment, the intelligence agent 151 may execute only some of the pre-processing to save battery power.

According to an embodiment, the intelligence agent 151 may include a wakeup recognition module recognizing a specific user voice input to wake up the user terminal. The wakeup recognition module may recognize the wake up command using the speech recognition module. When the wakeup recognition module receives the wake up command, the wakeup recognition module may activate the intelligence agent 151 to receive the user input. According to an embodiment, the wakeup recognition module of the intelligence agent 151 may be implemented with a low-power processor, which may include an audio codec. According to an embodiment, the intelligence agent 151 may be activated depending on the user input entered through a hardware key. When the intelligence agent 151 is activated, an intelligent app (e.g., a speech recognition app) operating in conjunction with the intelligence agent 151 may be executed.

According to an embodiment, the intelligence agent 151 may include a speech recognition module for executing the user input. The speech recognition module may recognize the user input for executing an action in an app. For example, the speech recognition module may recognize a limited number of voice inputs for executing an action in the apps 141 and 143 (e.g., speech such as "click" for executing a capturing action in a camera app). The speech recognition module may be used in conjunction with the intelligence server 200 to assist the intelligence server 200. For example, the speech recognition module may recognize its limited number of voice inputs more quickly than the intelligence server 200. According to an embodiment, the speech recognition module may be implemented in a secondary processor separate from the processor 150.

According to an embodiment, the speech recognition module and/or the wakeup recognition module of the intelligence agent 151 may recognize the user input by using an algorithm for recognizing user voice. For example, the algorithm may be a hidden Markov model (HMM) algorithm, an artificial neural network (ANN) algorithm, a dynamic time warping (DTW) algorithm, etc.

According to an embodiment, the intelligence agent 151 may convert the voice input of the user to text data. Alternatively, the intelligence agent 151 may transmit the voice of the user to the intelligence server 200. The intelligence server 200 in turn converts the voice to text, and may transmit the text to the intelligence agent 151. In either case, the intelligence agent 151 may display the text data in the display 120.

According to an embodiment, the intelligence agent 151 may receive path rules from the intelligence server 200. According to an embodiment, the intelligence agent 151 may transmit the path rules to the execution manager module 153.

According to an embodiment, the intelligence agent 151 may transmit the execution result log that resulted from the path rule to the intelligent service module 155, and the transmitted execution result log may be accumulated and managed as preference information of the user of the persona module 155b.

According to an embodiment, the execution manager module 153 may receive the path rule from the intelligence agent 151 to execute the apps 141 and 143 and may prompt the apps 141 and 143 to execute the actions 141b and 143b based on the path rule. For example, the execution manager module 153 may transmit command information (e.g., information about the path rule) for executing the actions 141b and 143b to the apps 141 and 143 and may receive results of the actions 141b and 143b from the apps 141 and 143.

According to an embodiment, the execution manager module 153 may mediate the command information (e.g., information about the path rule) for executing the actions 141b and 143b between the intelligence agent 151 and the apps 141 and 143. The execution manager module 153 may bind the apps 141 and 143 to be executed based on the path rule and may transmit the command information (e.g., information about the path rule) to the apps 141 and 143. For example, the execution manager module 153 may sequentially transmit commands for the actions 141b and 143b included in the path rule to the apps 141 and 143 and may sequentially execute the actions 141b and 143b of the apps 141 and 143 based on the path rule.

According to an embodiment, the execution manager module 153 may manage the execution states of the actions 141b and 143b. For example, the execution manager module 153 may receive information about the execution states of the actions 141b and 143b from the apps 141 and 143. When the actions 141b and 143b are partially executed and require additional user input, the execution manager module 153 may transmit information about the partial execution to the intelligence agent 151. The intelligence agent 151 may then cause the display 120 to display an interface so that the user can input additional information, such as additional parameter information. In another example, when the actions 141b and 143b are executed, speech may be received from the user, and the execution manager module 153 may transmit information about the execution states of the apps 141 and 143 to the intelligence agent 151. The intelligence agent 151 may derive parameter information of the speech of the user using the intelligence server 200 and may transmit the received parameter information to the execution manager module 153. The execution manager module 153 may then use the parameter information in the execution of the actions 141b and 143b.

According to an embodiment, the execution manager module 153 may transmit parameter information included in the path rule to the apps 141 and 143. When the plurality of apps 141 and 143 are sequentially executed, the execution manager module 153 may transmit parameter information from one app to another app.

According to an embodiment, the execution manager module 153 may receive a plurality of path rules. The execution manager module 153 may select the plurality of path rules based on user speech. For example, when the user's speech specifies app 141 executing action 141a but does not specify app 143 executing action 143b, the execution manager module 153 may receive a plurality of path rules, in which the same app 141 (e.g., gallery app) executing the one action 141a is executed and in which a different app 143 (e.g., message app or Telegram app) executing the other action 143b is executed. For example, the execution manager module 153 may execute the same actions 141b and 143b (e.g., the same successive actions 141b and 143b) of the plurality of path rules. When the execution manager module 153 executes an action, the execution manager module 153 may display a state screen allowing the user to select either apps 141 or 143 for completing the action.

According to an embodiment, the intelligence service module 155 may include a context module 155a, a persona module 155b, and/or a suggestion module 155c.

The context module 155a may collect current states of the apps 141 and 143 from the apps 141 and 143. For example, the context module 155a may receive context information indicating the current states of the apps 141 and 143.

The persona module 155b may manage personal information of the user of the user terminal 100. For example, the persona module 155b may collect the usage information and execution results of the user terminal 100.

The suggestion module 155c may predict the intent of the user in order to recommend functions of the user terminal to the user. For example, the suggestion module 155c may recommend functions based on the current state (e.g., time, place, situation, current execution state of the user terminal, etc.) of the user terminal.

Figure 3:
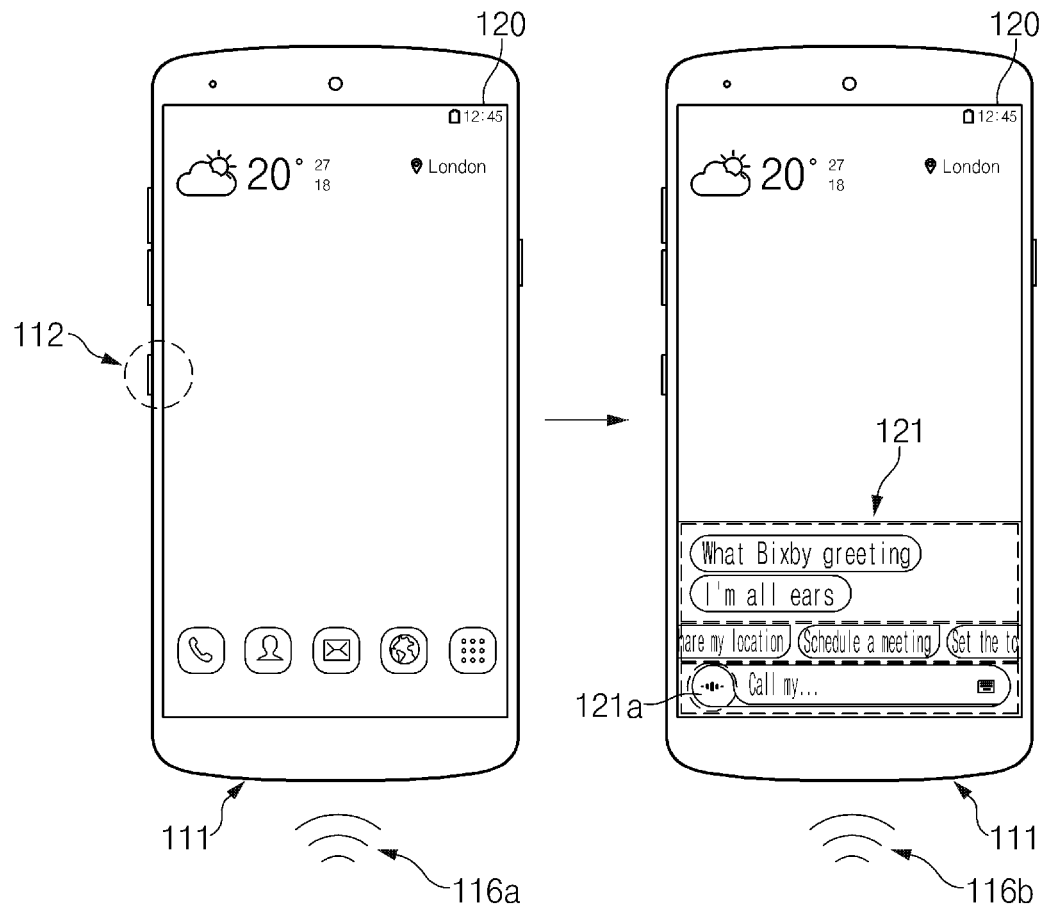
FIG. 3 is a view illustrating an intelligent app of a user terminal while it is executing, according to an embodiment of the present disclosure.

FIG. 3 is a view illustrating an intelligent app of a user terminal while it is executing, according to an embodiment of the present disclosure.

FIG. 3 illustrates that the user terminal 100 receives a user input to execute the intelligent app (e.g., a speech recognition app) operating in conjunction with the intelligence agent 151.

According to an embodiment, the user terminal 100 may begin to execute the intelligent app when the user enters an input through a hardware key 112. For example, when the user terminal 100 receives the user input through the hardware key 112, the user terminal 100 may display a UI 121 of the intelligent app in the display 120. Subsequently, the user may touch a speech recognition button 121a in the UI 121 to enter a voice input 116b. In another example, the user may enter voice input 116b while continuously pressing the hardware key 112.

According to an embodiment, the user terminal 100 may execute the intelligent app using a microphone 111. For example, when a specified voice input 116a (e.g., wake up!) is entered through the microphone 111, the user terminal 100 may display the UI 121.

Hereinafter, it is assumed that a system including the user terminal 100 and the intelligence server 200 performs the process of FIGS. 4A to 7.

In addition, in descriptions of FIGS. 4A to 7, it is understood that the operations described as being performed by the user terminal 100 is controlled by the processor 150 of the user terminal 100. The user terminal 100 may further include a communication circuit 160, and the user terminal 100 may communicate with the intelligence server 200 through the wireless communication circuit 160.

The operations described as being performed by the user terminal 100 may be implemented with instructions capable of being performed (or executed) by the processor 150 of the user terminal 100. For example, the instructions may be stored in a computer-readable recording medium or the memory 140 of the user terminal 100 illustrated in FIG. 2.

The intelligence server 200 may include at least one network interface 210, at least one processor 220, and at least one memory 230, as shown in FIG. 2.

The network interface 210 may support the establishment of a communication channel with the user terminal 100 and may the execution wired or wireless communication through the established communication channel.

The processor 220 may be operatively connected to the network interface 210. In descriptions of FIGS. 4A to 7, the processor 220 may control the operations described as being performed by the intelligence server 200. The operations described as being performed by the intelligence server 200 may be implemented with instructions capable of being performed (or executed) by the processor 220 of the intelligence server 200. For example, the instructions may be stored in a computer-readable recording medium or the memory 230 of the intelligence server 200. The memory 230 may be operatively connected to the processor 220.

In an embodiment, the memory 140 of the user terminal 100 and the memory 230 of the intelligence server 200 may store a plurality of language models of a first language. The plurality of language models of the first language may have different speech models from one another, and different language models may be provided for users whose native language is not the first language. For example, the first language may be English, and the native language that is different from the first language may be Korean, Chinese, Japanese, Hindi, French, British English, German, Spanish, Portuguese, Russian, etc.

For example, the plurality of language models may include a Korean English speech model, a Chinese English speech model, a Japanese English speech model, a Hindi English speech model, and/or a Spanish English speech model. The Korean English speech model is a language model for recognizing English spoken by speakers whose native or mother language is Korean, i.e. native Korean speakers; the Chinese English speech model is a language model for recognizing English spoken by native Chinese speakers; the Japanese English speech model is a language model for recognizing English spoken by native Japanese speakers, etc.

On the other hand, according to another embodiment, the first language described above may not be English but instead be another language such as Korean, Chinese, Japanese, etc.

According to an embodiment, the memory 140 of the user terminal 100 and the memory 230 of the intelligence server 200 may store a plurality of sample texts including words, phrases, and/or sentences.

According to an embodiment, the memory 140 of the user terminal 100 and the memory 230 of the intelligence server 200 may include a plurality of text groups respectively corresponding to the plurality of language models, and each of text groups may include one or more sample texts.

According to an embodiment, the memory 140 of the user terminal 100 and the memory 230 of the intelligence server 200 may include one or more sentences corresponding to the Korean English speech model, one or more sentences corresponding to the Chinese English speech model, one or more sentences corresponding to the Japanese English speech model, etc.

According to an embodiment, sample texts included in the text groups may include keywords that persons corresponding to the respective text groups distinctively pronounce.

Table 1 includes exemplary keywords that persons distinctively pronounce, and sample texts including the keyword.

TABLE 1

| Language | Key Word | Speech |
| --- | --- | --- |
| Chinese | Usually | I usually take a walk in morning |
| Korean | bookmark | Search for Samsung in my Internet bookmarks |
| Hindi | Euler | Tell me about Euler's formula |
| Spain | bridge | A long time ago, there was a bridge here |

According to an embodiment, pronunciation of "usually" by native Chinese speakers, pronunciation of "bookmark" by native Korean speakers, pronunciation of "Euler" by native Hindi speakers, and pronunciation of "bridge" by native Spanish speakers may be distinguished from the pronunciations of these words by native English speakers.

According to an embodiment, when a keyword that a person distinctively pronounces and a sample text including the corresponding keyword are used, the characteristic pronunciation of the person whose native language is not English may be determined.

According to an embodiment, the memory 140 of the user terminal 100 and the memory 230 of the intelligence server 200 may include information about the pre-specified keywords described above.

According to an embodiment, the memory 140 of the user terminal 100 may store personalization information of the user. The personalization information of the user may include the type (e.g., Korean character, Chinese character, Japanese character, etc.) of characters used in contacts stored in the memory 140, the names stored in the contacts, local settings, language setting information of a virtual keyboard of the user terminal, etc.

Figure 4A:
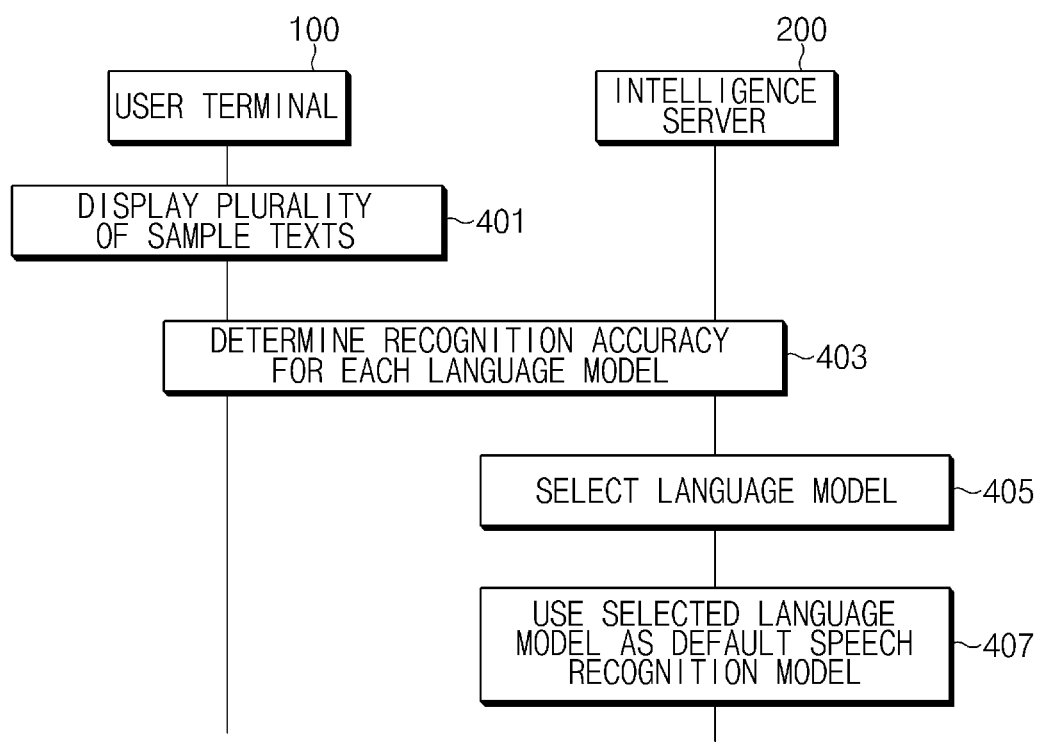
FIG. 4A is a flowchart illustrating operations for determining a speech recognition model, according to an embodiment.

FIG. 4A is a flowchart illustrating operations for determining a speech recognition model, according to an embodiment.

In operation 401, the processor 150 of the user terminal 100 may display a plurality of sample texts on the touchscreen display 120.

According to an embodiment, the plurality of sample texts may include words, phrases and/or sentences. According to an embodiment, the processor 150 of the user terminal 100 may provide the plurality of sample texts as a user interface on the touchscreen display 120.

According to an embodiment, the processor 150 of the user terminal 100 may determine the language of the displayed sample texts based on language setting information. For example, when the language of the user terminal 100 is set to English, the processor 150 of the user terminal 100 may display a plurality of sample texts written in English. For another example, when the language of the user terminal 100 is set to Korean, the processor 150 of the user terminal 100 may display a plurality of sample texts written in Korean.

According to an embodiment, the processor 150 of the user terminal 100 may select the plurality of sample texts from a plurality of text groups stored in the memory 140 and may display the selected plurality of sample texts on the touchscreen display 120.

For example, the memory 140 may include a text group corresponding to each of a first language model, a second language model, and a third language model. The processor 150 of the user terminal 100 may select a sample text from the text group corresponding to the first language model, a sample text from the text group corresponding to the second language model, and a sample text from the text group corresponding to the third language model. In other words, the selected plurality of sample texts may include at least one sample corresponding to each of the language models stored in the memory 140.

According to an embodiment, the processor 150 of the user terminal 100 and the processor 220 of the intelligence server 200 may use a preset plurality of sample texts. According to an embodiment, the processor 150 of the user terminal 100 may display the preset plurality of sample texts on the touchscreen display 120.

According to an embodiment, before operation 401, the processor 150 of the user terminal 100 may receive the plurality of sample texts from the intelligence server 200 through the communication circuit 160 and may display the received plurality of sample texts on the touchscreen display 120.

According to an embodiment, before operation 403, the processor 150 of the user terminal 100 may display a first object on the touchscreen display 120 for activating the reception of a user's speech. According to an embodiment, when the user selects the first object through the touchscreen display 120, the processor 150 of the user terminal 100 may receive the user's speech in operation 403 described below.

According to an embodiment, before operation 403, the processor 150 of the user terminal 100 may display a second object on the touchscreen display 120 for using a preset language model as a default speech recognition model. According to an embodiment, when the user selects the second object through the touchscreen display 120, the processor 150 of the user terminal 100 may allow the intelligence server 200 to use the preset language model as the default speech recognition model.

In operation 403, the user terminal 100 and the intelligence server 200 may determine recognition accuracy for each language model (e.g. an English language model for native Korean speakers, an English language model for native Chinese speakers, etc.).

According to an embodiment, in operation 403, the processor 150 of the user terminal 100 may receive the user's speech associated with the displayed plurality of sample texts through the microphone 111. The processor 150 of the user terminal 100 then transmits data associated with the received user's speech to the intelligence server 200 through the communication circuit 160. Next, the processor 220 of the intelligence server 200 performs automatic speech recognition (ASR) on data associated with the user's speech by using a plurality of language models. Finally, the processor 220 of the intelligence server 200 determines the recognition accuracy for each language model based on the results of the ASR.

According to an embodiment, when the processor 150 of the user terminal 100 transmits the data associated with the user's speech to the intelligence server 200, the processor 150 of the user terminal 100 may also transmit data associated with the sample texts to the intelligence server 200. For example, the processor 150 of the user terminal 100 may transmit information regarding the sorting order of the sample texts to the intelligence server 200.

According to an embodiment, the processor 150 of the user terminal 100 may perform the ASR instead of the processor 220 of the intelligence server 200. When this is the case, the processor 150 of the user terminal 100 may use various recognition schemes such as isolated word recognition, connected word recognition, large vocabulary recognition, etc.

According to an embodiment, operation 403 may further include an operation in which the processor 220 of the intelligence server 200 determines scores on the results of the ASR. Detailed descriptions of how the scores are determined is provided below and in connection with FIGS. 5 and 7.

According to an embodiment, the processor 220 of the intelligence server 200 may determine the score for each word or phoneme included in the sample text. According to an embodiment, the processor 220 of the intelligence server 200 may determine the score on some pre-specified keyword. For example, when the sample text is "choose a music genre for me" and the pre-specified keyword is "genre", the processor 220 of the intelligence server 200 may perform ASR on "choose a music genre for me" and may determine the score on "genre." According to an embodiment, the processor 220 of the intelligence server 200 may determine the score on each of words (e.g., "choose," "a music," "genre," "for," and "me") in the sample text and may determine the final score on the sample text by summing scores or calculating an average of the scores.

According to an embodiment, when the processor 220 of the intelligence server 200 determines recognition accuracy for each language model, the processor 220 of the intelligence server 200 may determine recognition accuracy by using the determined scores.

For example, the processor 220 of the intelligence server 200 may determine, based on the ASR, a score for each language model for each piece of data in the user's speech. For example, when there are three pieces of data in the user's speech and there are four language models, the processor 220 of the intelligence server 200 may determine twelve scores. In an embodiment, the processor 220 of the intelligence server 200 may determine the recognition accuracy for each language model by summing scores for each language model or calculating an average for each language model. For example, the processor 220 of the intelligence server 200 may determine three scores based on data associated with the user's first speech, data associated with the user's second speech, and data associated with the user's third speech using the first language model. The processor 220 may then determine the recognition accuracy of the first language model by summing three scores or calculating the average.

For another example, the processor 220 of the intelligence server 200 may determine the recognition accuracy for each language model by using the highest score among the scores.

According to an embodiment, the processor 220 of the intelligence server 200 may apply weights based on the sample text and/or the language model corresponding to each score, to the scores to determine the recognition accuracy for each language model.

According to an embodiment, since the scores are determined based on the results of the ASR, the scores may be dependent on the sample text, the user's speech, and the language model. Thus, according to an embodiment, the weights applied to the scores may be based on the sample text and/or the language model that affects the scores.

For example, the processor 220 of the intelligence server 200 may perform ASR on the user's first speech associated with the first sample text and the user's second speech associated with the second sample text using a first language model and a second language model. In this example, the score on the user's first speech by using the first language model may be 2 points; the score on the user's first speech by using the second language model may be 2.5 points; the score on the user's second speech by using the first language model may be 3 points; and the score on the user's second speech by using the second language model may be 4 points.

As an example, the weight based on the first sample text and the first language model may be 0.2; the weight based on the first sample text and the second language model may be 0.2; the weight based on the second sample text and the first language model may be 0.3; and the weight based on the second sample text and the second language model may be 0.1.

In an embodiment, in the case where the weight is not applied, the recognition accuracy of the first language model may be 5(=2+3) and the recognition accuracy of the second language model may be 6.5(=2.5+4). In an embodiment, in the case where the weight is applied, the recognition accuracy of the first language model may be 1.3(=2×0.2+3×0.3) and the recognition accuracy of the second language model may be 0.9(=2.5×0.2+4×0.1). Thus, the recognition accuracy for each language model may be changed by applying the weight.

According to an embodiment, the processor 220 of the intelligence server 200 may determine the recognition accuracy for each language model by applying confidence levels corresponding to the ASR to the scores.

According to an embodiment, the processor 220 of the intelligence server 200 may determine the confidence levels by comparing the texts obtained by performing the ASR to the sample texts.

According to an embodiment, the confidence levels may indicate how reliable the result of ASR is. For example, the confidence levels may be expressed as values between 0 and 1 or may be expressed as values between 0 and 100.

In an embodiment, the score on the user's first speech by using the first language model may be 2 points; the score on the user's first speech by using the second language model may be 2.5 points; the score on the user's second speech by using the first language model may be 3 points; and the score on the user's second speech by using the second language model may be 4 points. In an embodiment, the confidence level of the first ASR result (the ASR of the user's first speech using the first language model) may be determined as 0.7; the confidence level of the second ASR result (the ASR of the user's first speech using the second language model) may be determined as 0.8; the confidence level of the third ASR result (the ASR of the user's second speech using the first language model) may be determined as 0.5; and the confidence level of the fourth ASR result (the ASR of the user's second speech using the second language model) may be determined as 0.4.

In an embodiment, the processor 220 of the intelligence server 200 may apply the confidence levels to the scores on each ASR result and may determine that the recognition accuracy of the first language model is 3.4(=2×0.7+2.5×0.8) and the recognition accuracy of the second language model is 3.1(=3×0.5+4×0.4).

Thus, according to an embodiment, the processor 220 of the intelligence server 200 may determine the recognition accuracy by using the determined confidence levels.

According to an embodiment, the processor 150 of the user terminal 100 may transmit personalization information of the user to the intelligence server 200 through the communication circuit 160. The processor 220 of the intelligence server 200 may apply weights based on the personalization information to the scores to determine the recognition accuracy for each language model. For example, in the case where the language used in the virtual keyboard of the user terminal 100 is Korean, the processor 150 of the user terminal 100 may assign a higher weight to the language model associated with Korean. According to an embodiment, when weights are not applied, the recognition accuracies of two language models may be the same as each other. But when the higher weight is assigned to the Korean language model, the recognition accuracy of the Korean language model may be higher.

According to an embodiment, operations that are part of operation 403 may be performed sequentially and repeatedly. For example, operations that are part of operation 403 may include the operation where the processor 150 of the user terminal 100 receives the user's first speech, which is associated with the first sample text, the operation where the processor 150 of the user terminal 100 transmits data associated with the user's first speech to the intelligence server 200 through the communication circuit 160, the operation where the processor 220 of the intelligence server 200 performs ASR on the data associated with the user's first speech using a plurality of language models, and the operation where the processor 220 of the intelligence server 200 determines the recognition accuracy for each language model based on the results of the ASR. These operations may be performed repeatedly. The detailed descriptions thereof will be described with reference to FIG. 5.

In operation 405, the processor 220 of the intelligence server 200 may select one of language models based on the results from the ASR.

According to an embodiment, the processor 220 of the intelligence server 200 may use the recognition accuracy as indicated by the scored to select one of language models. For example, the processor 220 of the intelligence server 200 may select the language model having the highest recognition accuracy.

According to an embodiment, the processor 220 of the intelligence server 200 may receive the personalization information of the user from the user terminal 100 through the network interface 210. According to an embodiment, the personalization information of the user may include the type of characters used in contacts stored in the memory 140 (e.g. Korean, Chinese, etc.), the names stored in the contacts, local settings, or language setting information of the virtual keyboard of the user terminal.

According to an embodiment, the processor 220 of the intelligence server 200 may select one of language models based on the received personalization information and the results from the performed ASR.

For example, the processor 220 of the intelligence server 200 may select one or more first language models based on the personalization information of the user and may select a second language model based on the results from the ASR. When the second language model is included in the one or more first language models, the processor 220 of the intelligence server 200 may select the second language model as a default automatic language model.

In operation 407, the processor 220 of the intelligence server 200 may use the selected language model as the default speech recognition model.

According to an embodiment, the processor 220 of the intelligence server 200 may use the selected language model for the purpose of obtaining voice data from the user.

According to an embodiment, the processor 220 of the intelligence server 200 may transmit a response indicating that the setting of the default speech recognition model is completed, through the network interface 210. The processor 150 of the user terminal 100 may then display a message indicating that settings of the default speech recognition model is completed on the touchscreen display 120.

Figure 4B:
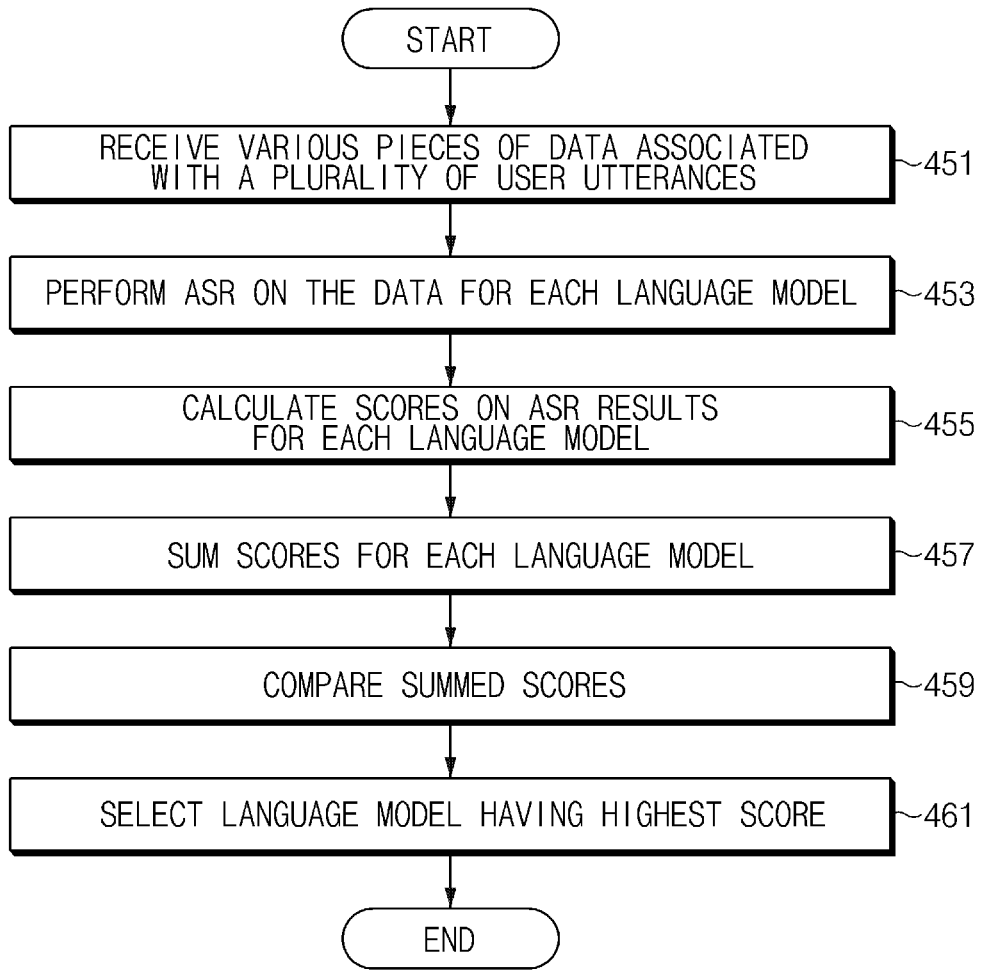
FIG. 4B is a flowchart illustrating operations for determining a speech recognition model, according to an embodiment.

FIG. 4B is a flowchart illustrating operations for determining a speech recognition model, according to an embodiment.

The operations of FIG. 4B may correspond to operation 403 to operation 405 of FIG. 4A.

In operation 451, the processor 220 of the intelligence server 200 may receive various pieces of data associated with a plurality of user's speeches from a user terminal.

In operation 453, the processor 220 of the intelligence server 200 may perform ASR on the data for each language model.

According to an embodiment, the processor 220 of the intelligence server 200 may perform ASR on the data for each language model by using a plurality of language models. According to an embodiment, the processor 220 of the intelligence server 200 may use various ASR schemes as described above.

In operation 455, the processor 220 of the intelligence server 200 may calculate scores on the ASR results for each language model.

According to an embodiment, the processor 220 of the intelligence server 200 may calculate scores for pre-specified keywords in the user's speech as well as calculating scores on the entire user's speech.

In operation 457, the processor 220 of the intelligence server 200 may sum scores for each language model.

According to an embodiment, when data of four user's speeches are received, there may be four scores for each language model. The processor 220 of the intelligence server 200 may sum the four scores for each language model.

In operation 459, the processor 220 of the intelligence server 200 may compare the summed scores.

According to an embodiment, the processor 220 of the intelligence server 200 may compare the highest score among the scores for each language model.

In operation 461, the processor 220 of the intelligence server 200 may select the language model having the highest score.

According to an embodiment, the processor 220 of the intelligence server 200 may select a language model, the summed score of which is the highest, as a language model used as the default automatic language model.

According to another embodiment, operation 455 to operation 461 may be performed by the processor 150 of the user terminal 100. For the purpose of performing operation 455 to operation 461, before operation 455, the processor 150 of the user terminal 100 may receive the ASR results for each language model from the intelligence server 200.

Figure 5:
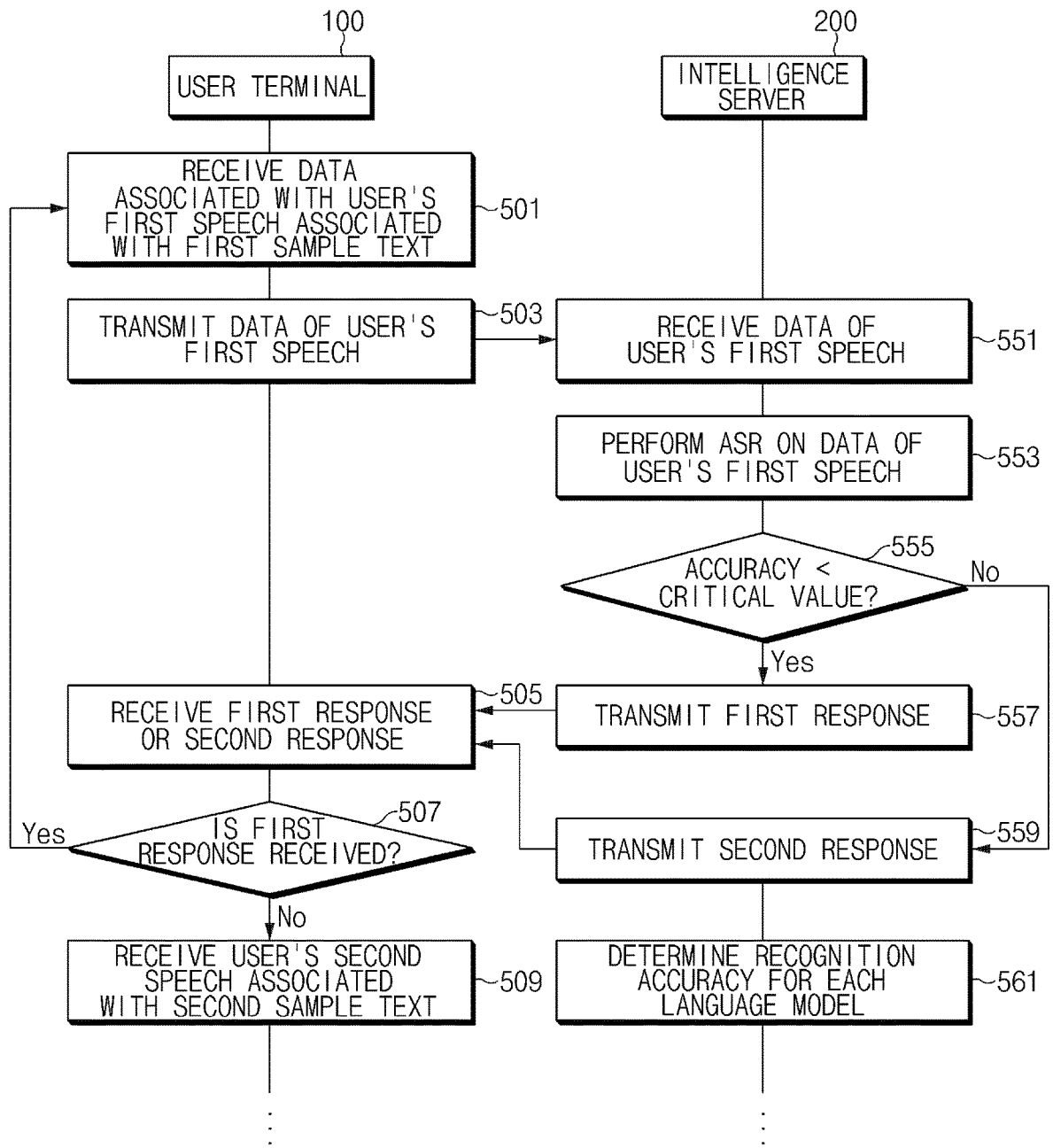
FIG. 5 is a flowchart illustrating operations for determining recognition accuracy for various language models, according to an embodiment.

FIG. 5 is a flowchart illustrating operations for determining recognition accuracy for various language models, according to an embodiment.

According to an embodiment, operations illustrated in FIG. 5 may correspond to the operation 403 of FIG. 4A. According to an embodiment, embodiments capable of being applied to operation 403 may be also applied to operation 501 to operation 561.

In operation 501, the processor 150 of the user terminal 100 may receive data associated with the user's first speech through the microphone 111. The speech may be associated with a first sample text, and the first sample text may be one of a plurality of sample texts.

In operation 503, the processor 150 of the user terminal 100 may transmit data of the user's first speech to the intelligence server 200 through the communication circuit 160. In other words, in operation 551, the processor 220 of the intelligence server 200 may receive the data of the user's first speech through the network interface 210.

In operation 553, the processor 220 of the intelligence server 200 may perform ASR on the data of the user's first speech by using a plurality of language models.

According to an embodiment, the processor 220 of the intelligence server 200 may determine the accuracy of the ASR. According to an embodiment, the processor 220 of the intelligence server 200 may determine an error rate based on the first sample text and the user's first speech. According to an embodiment, the processor 220 of the intelligence server 200 may determine a confidence level by comparing the first sample text and the text resulting from the ASR. According to an embodiment, the processor 220 of the intelligence server 200 may determine accuracy based on at least one of the determined error rate and the confidence level. In an embodiment, the determined error rate has an inverse relationship with the accuracy. If the determined error rate is lower, the accuracy of the ASR may be higher and if the determined confidence level is higher, the accuracy of the ASR may be higher.

As described above, the processor 220 of the intelligence server 200 may determine the error rate of the ASR based on the first sample text and the user's first speech. For example, the processor 220 of the intelligence server 200 may compare the text obtained from the ASR with the first sample text to determine the error rate of the ASR.

In an embodiment, in the case where the processor 220 of the intelligence server 200 performs the ASR on the data of the user's first speech by using five language models, the processor 220 of the intelligence server 200 may determine five respective error rates. According to an embodiment, the processor 220 of the intelligence server 200 may determine that the lowest error rate to be the error rate of the ASR. According to another embodiment, the processor 220 of the intelligence server 200 may determine that the average of the five error rates is the error rate of the ASR. However, the method of determining the error rate of the ASR is not limited to the above-described examples.

According to an embodiment, the processor 220 of the intelligence server 200 may determine the confidence level based on the text that resulted from the ASR.

According to an embodiment, the confidence level may indicate how reliable the ASR is. For example, the confidence level may be expressed as a value between 0 and 1 or may be expressed as a value between 0 and 100.

In the case where the determined accuracy is less than a critical value in operation 555, in operation 557, the processor 220 of the intelligence server 200 may transmit a first response to the user terminal 100 through the network interface 210. In the case where the determined accuracy is equal to or greater than the critical value in operation 555, in operation 559, the processor 220 of the intelligence server 200 may transmit a second response, which is different from the first response, to the user terminal 100 through the network interface 210. In other words, in operation 505, the processor 150 of the user terminal 100 may receive the first response or the second response through the communication circuit 160.

In the case where the processor 150 of the user terminal 100 receives the first response in operation 507, in operation 501, the processor 150 of the user terminal 100 may prompt the user to utter the first speech again. In turn, the processor 150 of the user terminal 100 may re-receive the user's first speech through the microphone 111.

In operation 561, the processor 220 of the intelligence server 200 may determine the recognition accuracy for each language model associated with the data of the user's first speech.

In the case where the processor 150 of the user terminal 100 receives the second response (i.e. when the first response is not received in operation 507), in operation 509, the processor 150 of the user terminal 100 may receive the user's second speech associated with the second sample text, which is different from a first sample text.

According to an embodiment, when the processor 150 of the user terminal 100 receives the second response, the processor 150 of the user terminal 100 may display an indicator (e.g., check mark) at the location of the touchscreen display 120 corresponding to the first sample text.

According to an embodiment, assuming that the user's second speech is received by the processor 150 at operation 501, the above-described operation 501 to operation 561 may be repeatedly performed until the all the plurality of sample texts displayed on the touchscreen display 120 of the user terminal 100 are processed.

Figure 6:
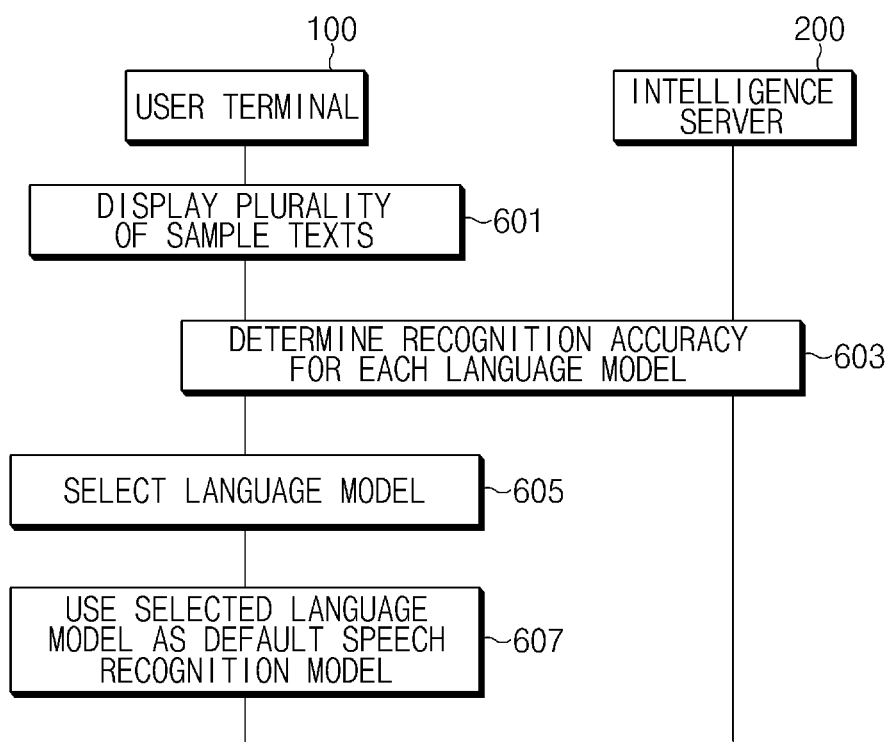
FIG. 6 is a flowchart illustrating operations for determining a speech recognition model, according to an embodiment.

FIG. 6 is a flowchart illustrating operations for determining a speech recognition model, according to an embodiment.

According to an embodiment, operation 601 to operation 607 of FIG. 6 may correspond to operation 401 to operation 407 of FIG. 4A. According to an embodiment, embodiments capable of being applied to operation 401 to operation 407 may be also applied to operation 601 to operation 607.

In operation 601, the processor 150 of the user terminal 100 may display a plurality of sample texts on the touchscreen display 120.

According to an embodiment, before operation 603, the processor 150 of the user terminal 100 may display a second object on the touchscreen display 120 for setting a preset language model as the default speech recognition model. According to an embodiment, when the user selects the second object through the touchscreen display 120, the processor 150 of the user terminal 100 may set the preset language model as the default speech recognition model.

In operation 603, the user terminal 100 and the intelligence server 200 may determine recognition accuracy for each language model (e.g. an English language model for native Korean speakers, an English language model for native Chinese speakers, etc.).

According to an embodiment, operation 603 may include the operation in which the processor 150 of the user terminal 100 receives the user's speech associated with the displayed plurality of sample texts through the microphone 111, the operation in which the processor 150 of the user terminal 100 transmits data associated with the received user's speech to the intelligence server 200 through the communication circuit 160, the operation in which the processor 220 of the intelligence server 200 performs ASR on data associated with the user's speech by using a plurality of language models, the operation in which the processor 220 of the intelligence server 200 transmits the results of the ASR to the user terminal 100, and the operation in which the processor 150 of the user terminal 100 determines the recognition accuracy for each language model based on the results of the ASR.

In operation 605, the processor 150 of the user terminal 100 may select one of language models based on the results from the ASR.

In operation 607, the processor 150 of the user terminal 100 may use the selected language model as the default speech recognition model.

According to an embodiment, after operation 607, the processor 150 of the user terminal 100 may display a message on the touchscreen display 120 indicating that settings of the default speech recognition model is completed.

Operation 605 and operation 607 are different from operation 405 and operation 407 in that the processor 220 of the intelligence server 200 transmits the results of the ASR to the user terminal 100 and the user terminal 100 is the system that processes the results of the ASR. Thus, either the processor 220 of the intelligence server 200 or the processor 150 of the user terminal 100 may perform operations 405/605 and 407/607.

Figure 7:
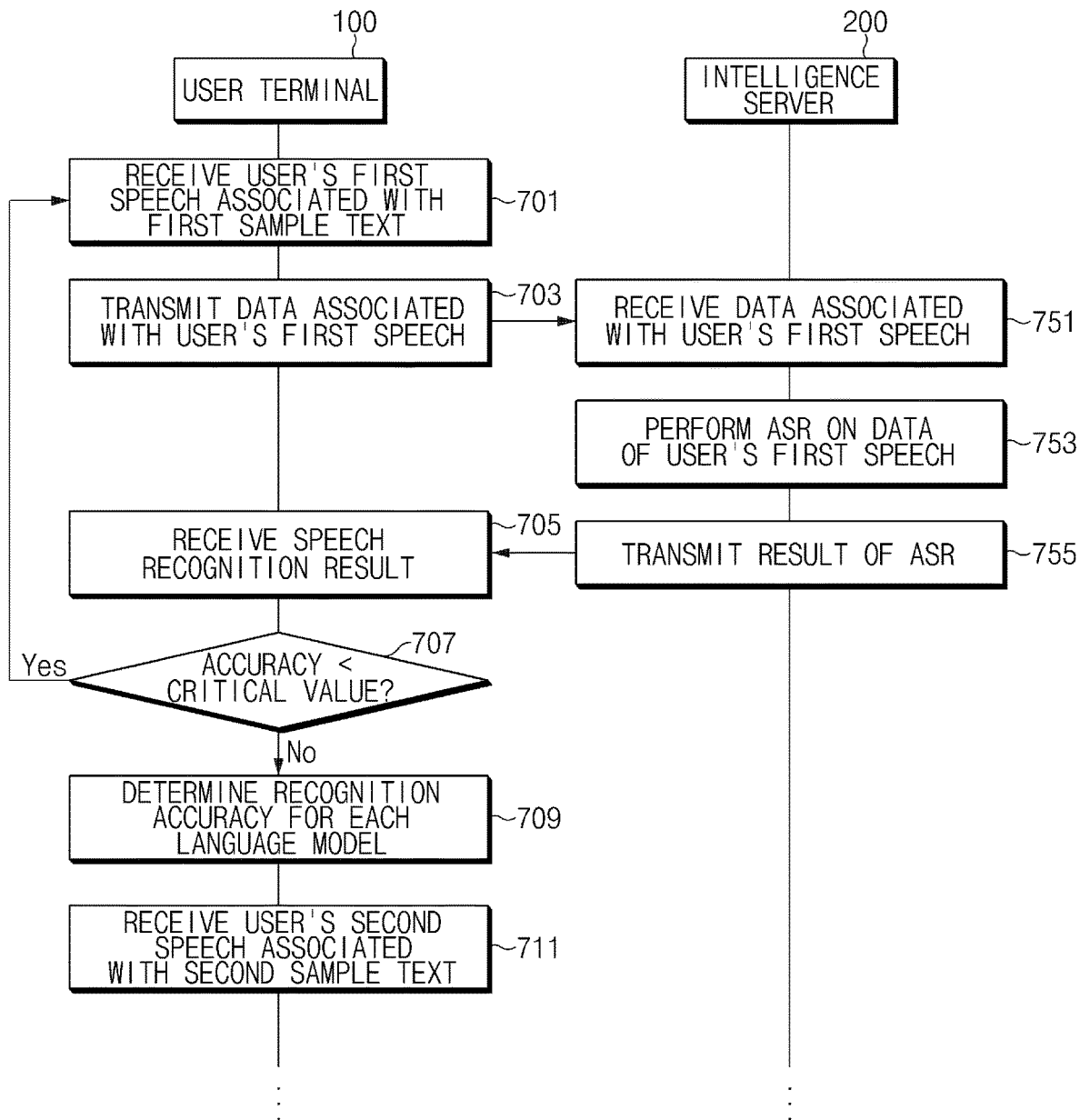
FIG. 7 is a flowchart illustrating operations for determining recognition accuracy for various language models, according to an embodiment.

FIG. 7 is a flowchart illustrating operations for determining recognition accuracy for various language models, according to an embodiment.

According to an embodiment, operations illustrated in FIG. 7 may correspond to the described operation 603 of FIG. 6. According to an embodiment, embodiments capable of being applied to operation 603 may be also applied to operation 701 to operation 755.

In operation 701, the processor 150 of the user terminal 100 may receive data of the user's first speech through the microphone 111. The first speech may be associated with a first sample text, and the first sample text may be one of a plurality of sample texts.

In operation 703, the processor 150 of the user terminal 100 may transmit data associated with the user's first speech to the intelligence server 200 through the communication circuit 160. In other words, in operation 751, the processor 220 of the intelligence server 200 may receive the data associated with the user's first speech through the network interface 210.

In operation 753, the processor 220 of the intelligence server 200 may perform ASR on the data of the user's first speech by using a plurality of language models (e.g. an English language model for native Korean speakers, an English language model for native Chinese speakers, etc.).

According to an embodiment, the processor 220 of the intelligence server 200 may further determine the accuracy of the ASR based on the first sample text and the user's first speech. According to an embodiment, the accuracy may not be determined by the processor 220 of the intelligence server 200 but may be determined by the processor 150 of the user terminal 100 after operation 705.

In operation 755, the processor 220 of the intelligence server 200 may transmit the result of the ASR to the user terminal 100. In other words, in operation 705, the processor 150 of the user terminal 100 may receive the speech recognition result through the communication circuit 160.

According to an embodiment, the processor 220 of the intelligence server 200 may further transmit the determined accuracy of the ASR to the user terminal 100.

According to an embodiment, the processor 150 of the user terminal 100 may determine the accuracy of the ASR based on the first sample text and the user's first speech. According to an embodiment, the processor 150 of the user terminal 100 may determine the error rate of the ASR based on the first sample text and the user's first speech, as described above. According to an embodiment, the processor 150 of the user terminal 100 may determine the confidence level of the ASR based on the result of the ASR performed on the data of the user's first speech, as described above. According to an embodiment, the processor 150 of the user terminal 100 may determine the accuracy of the ASR based on at least one of the determined error rate and/or confidence level.

In the case where the accuracy is less than a critical value in operation 707, in operation 701, the processor 150 of the user terminal 100 may re-receive the user's first speech through the microphone 111.

In the case where the accuracy is not less than the critical value in operation 707, in operation 709, the processor 150 of the user terminal 100 may determine the recognition accuracy for each language model.

According to an embodiment, in the case where the accuracy is not less than the critical value, the processor 150 of the user terminal 100 may display an indicator (e.g., check mark) at the location of the touchscreen display 120 corresponding to the first sample text.

In operation 711, the processor 150 of the user terminal 100 may receive the user's second speech associated with the second sample text through the microphone 111. The second sample text may be different from the first sample text and may be another one of the plurality of sample texts.

According to an embodiment, assuming that the user's second speech associated with the second sample text is received at operation 701, the above-described operation 701 to operation 711 may be repeatedly performed until the all the plurality of sample texts displayed on the touchscreen display 120 of the user terminal 100 is processed.

FIGS. 8A to 8F are views illustrating screens displayed in a display 120 while the user terminal 100 sets a default speech recognition model, according to an embodiment.

FIGS. 8A to 8F illustrate screens displayed by the user terminal 100 while operation 401 to operation 407 or operation 601 to operation 607 are performed.

Figure 8A:
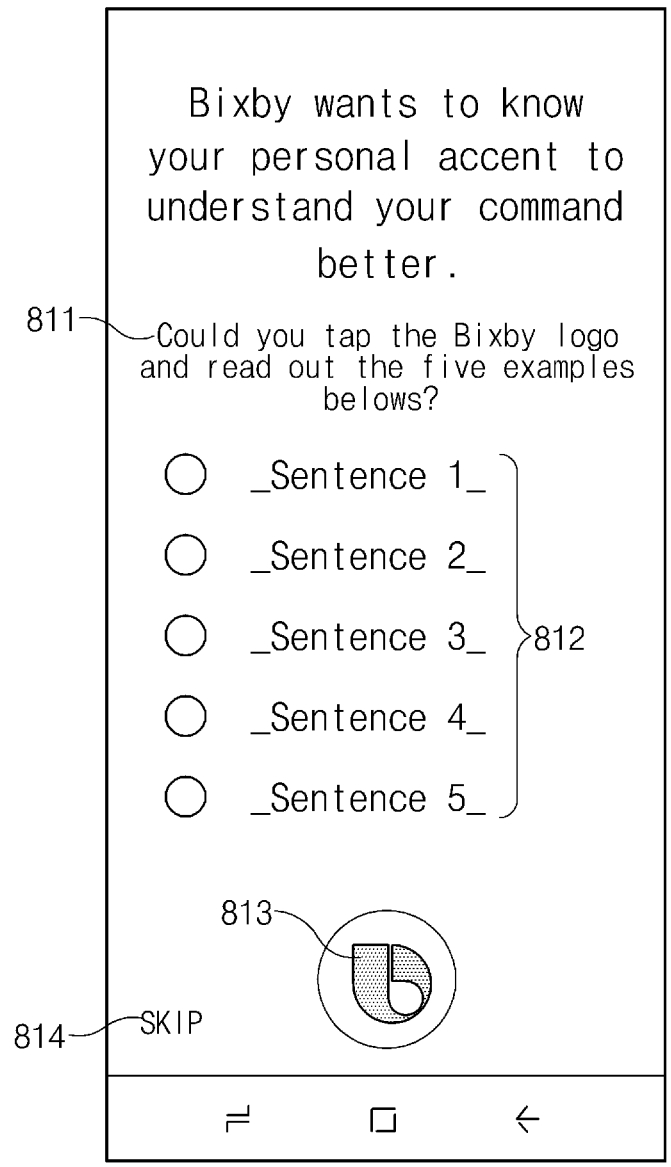
FIG. 8A, FIG. 8B, FIG. 8C, FIG. 8D, FIG. 8E and FIG. 8F are views illustrating screens displayed in a display while a user terminal sets a default speech recognition model, according to an embodiment.

FIG. 8A may be a screen corresponding to operation 401 and operation 601. Referring to FIG. 8A, the processor 150 of the user terminal 100 may display, on the touchscreen display 120, a guide message 811 for inducing the user to enter a user input to select a first object, a plurality of sample texts 812, a first object 813, and a second object 814.

Figure 8B:
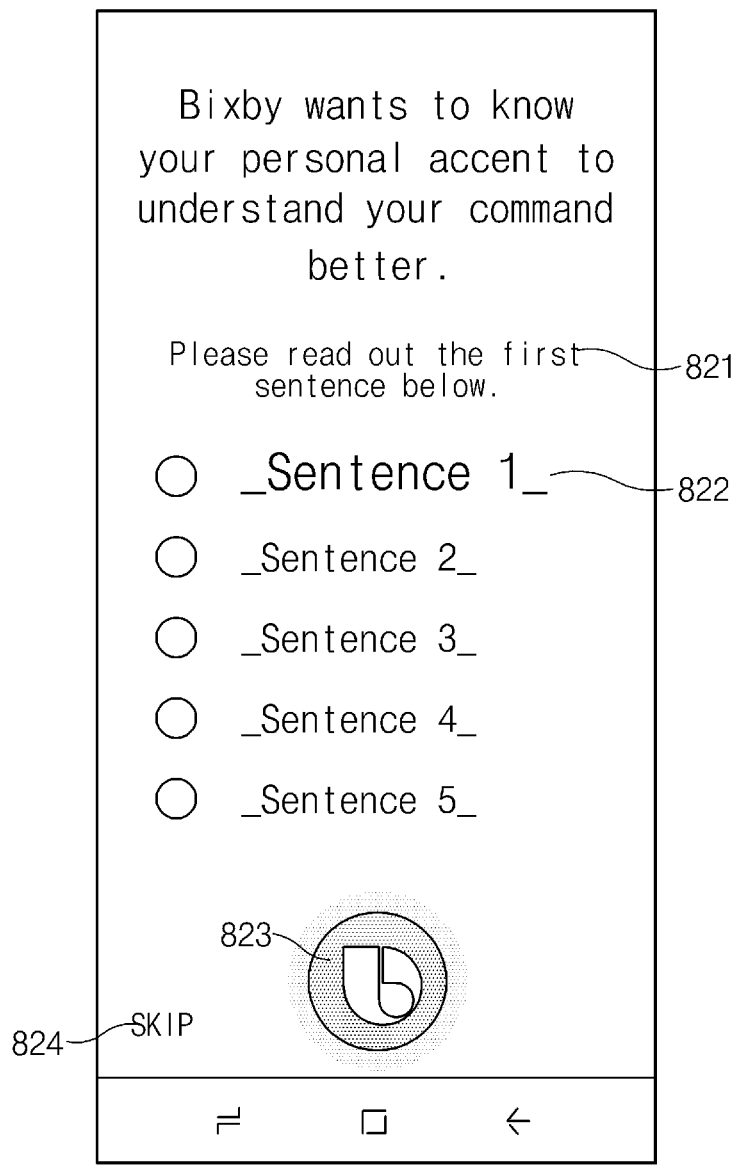

According to an embodiment, when the user input to select the first object is received, the processor 150 of the user terminal 100 may display a screen as illustrated in FIG. 8B.

According to an embodiment, when the user input to select the second object is received, the processor 150 of the user terminal 100 may allow the intelligence server 200 to use a preset language model as a default speech recognition model. According to an embodiment, when the user terminal 100 selects the default speech recognition model, and when the user input to select the second object is received, the processor 150 of the user terminal 100 may use the preset language model as the default speech recognition model. For example, the preset language model may be an American English speech model. When the second object is selected, operation 403 to operation 407 or operation 603 to operation 607 may not be performed, and the American English speech model may be used as the default speech recognition model.

According to an embodiment, the second object may be displayed in FIGS. 8B to 8E. Thus, when a user input to select the second object is received at any stage, the preset language model may be used as the default speech recognition model.

FIG. 8B illustrates a screen corresponding to operation 501 and operation 701. Referring to FIG. 8B, the processor 150 of the user terminal 100 may display, on the touchscreen display 120, a guide message 821 for guiding the user to speak a first sample text, a first sample text 822 displayed to be visually different from other sample texts, a first object 823 displayed as being activated, and a second object 824.

According to an embodiment, the processor 150 of the user terminal 100 may display the first sample text 822 to be different from other sample texts. For example, the first sample text 822 may be bolded or have a different color and/or size.

According to an embodiment, the processor 150 of the user terminal 100 may display the first object 823 as being activated for indicating that the reception of the user's speech is activated.

Figure 8C:
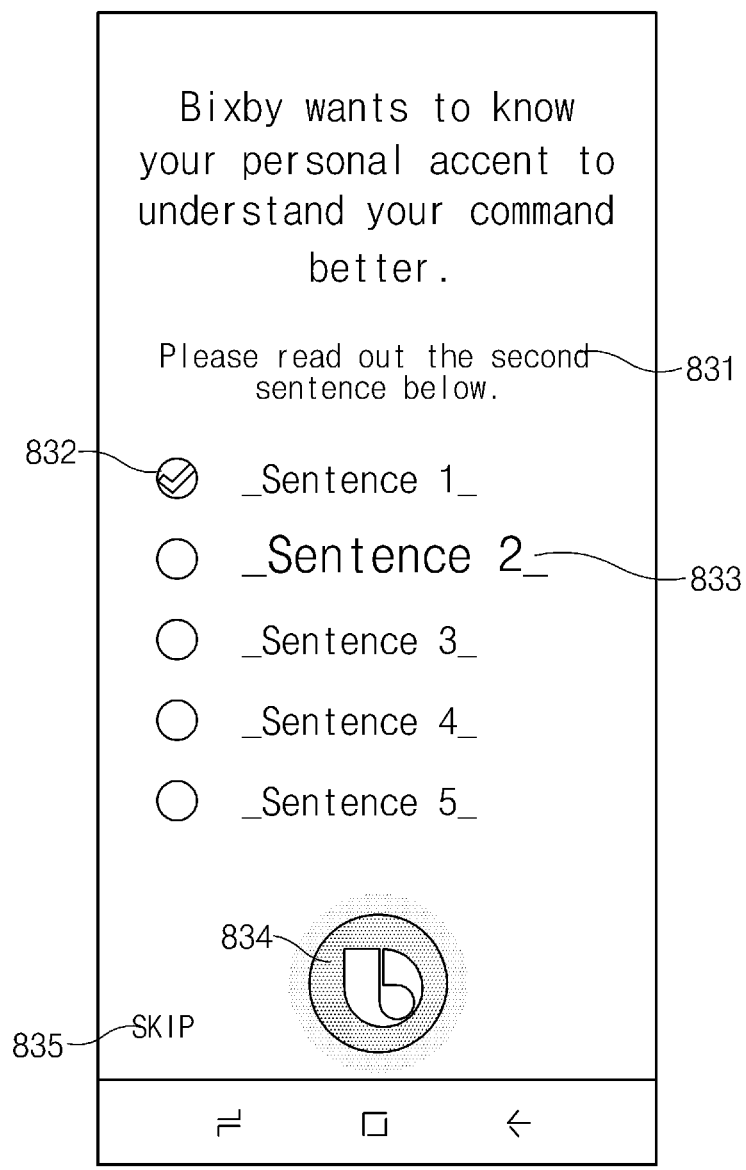

FIG. 8C illustrates a screen corresponding to operation 509 and operation 711. Referring to FIG. 8C, the processor 150 of the user terminal 100 may display, on the touchscreen display 120, a guide message 831 for guiding the user to speak a second sample text, an indicator 832 displayed at a location corresponding to the first sample text, a second sample text 833 displayed to be visually different from other sample texts, a first object 834 displayed as being activated, and a second object 835.

According to an embodiment, the processor 150 of the user terminal 100 may display the indicator 832 indicating that the user's first speech has been recognized. The indicator 832 may be displayed at a location corresponding to the first sample text.

Figure 8D:
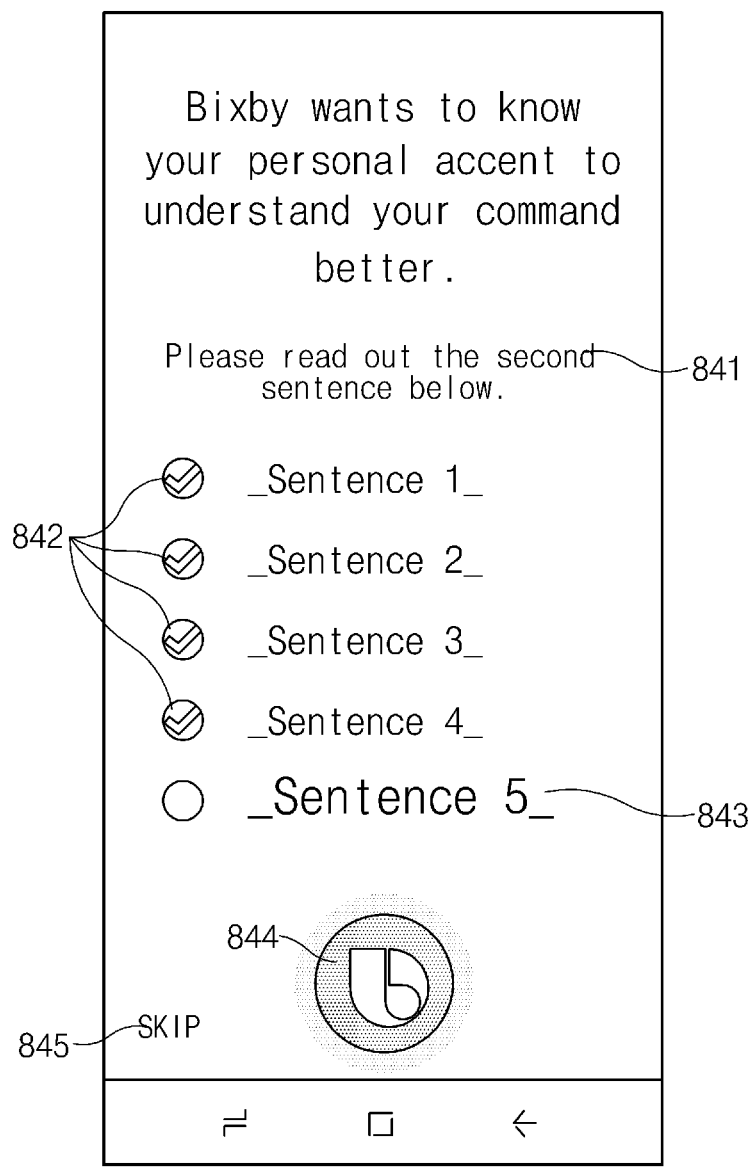

FIG. 8D illustrates a screen for receiving a user's speech associated with a fifth sample text while the operations shown in FIGS. 4 and 6 are performed repeatedly. Referring to FIG. 8D, the processor 150 of the user terminal 100 may display, on the touchscreen display 120, a guide message 841 for guiding the user to speak a fifth sample text, indicators 842 respectively displayed at locations corresponding to first to fourth sample texts, the fifth sample text 843 displayed to be visually different from other sample texts, a first object 844 displayed as being activated, and a second object 845.

Figure 8E:
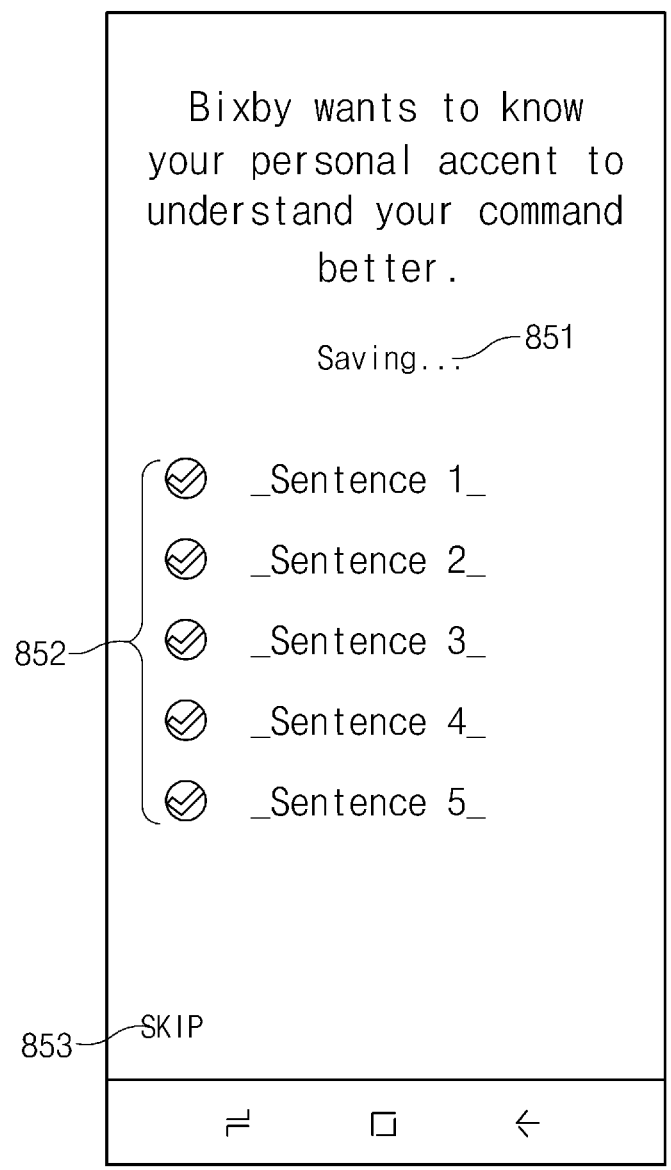

FIG. 8E illustrates a screen that may be displayed while operation 405 and operation 605 are performed. Referring to FIG. 8E, the processor 150 of the user terminal 100 may display a message 851 indicating that data associated with the user's speech are stored, indicators 852 respectively displayed at locations corresponding to first to fifth sample texts, and a second object 853.

Figure 8F:
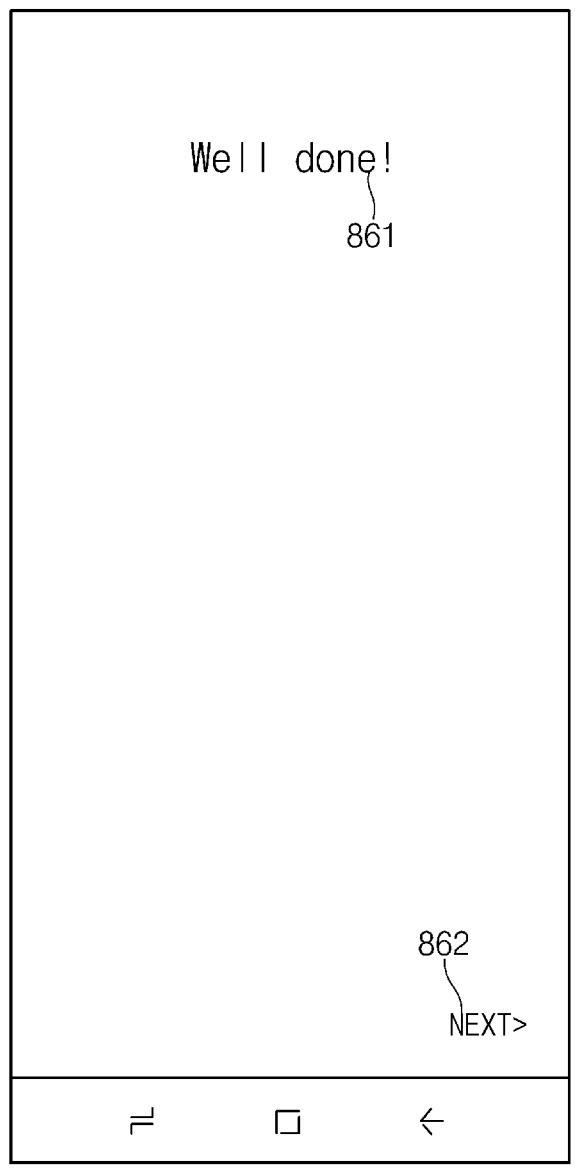

FIG. 8F is a screen indicating that setting of a speech recognition model is completed. Referring to FIG. 8F, the processor 150 of the user terminal 100 may display a message 861 indicating that settings of a speech recognition model is completed, and a third object 862.

According to an embodiment, when a user input to select the third object 862 is received, the processor 150 of the user terminal 100 may end execution of the operations disclosed herein.

Figure 9A:
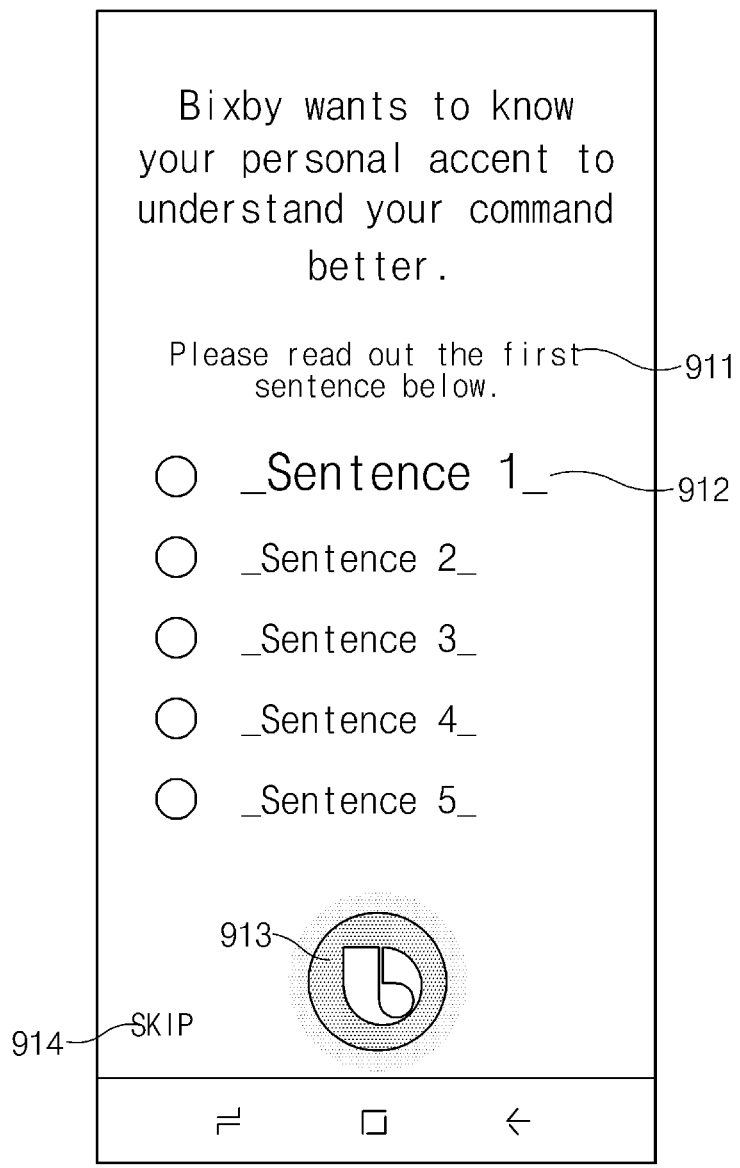
FIG. 9A is a view illustrating a screen displayed while a user terminal waits for reception of a user's speech.

FIG. 9A is a view illustrating a screen displayed while the user terminal 100 waits for reception of the user's speech.

FIG. 9A is a screen corresponding to operation 501 and operation 701, and may be the same screen as the one illustrated in FIG. 8B. Referring to FIG. 9A, the processor 150 of the user terminal 100 may display, on the touchscreen display 120, a guide message 911 for guiding the user to speak a first sample text, a first sample text 912 displayed to be visually different from other sample texts, a first object 913 displayed as being activated, and a second object 914. The second object of FIGS. 9A to 9C may be the same as the second object of FIGS. 8A to 8E.

Figure 9B:
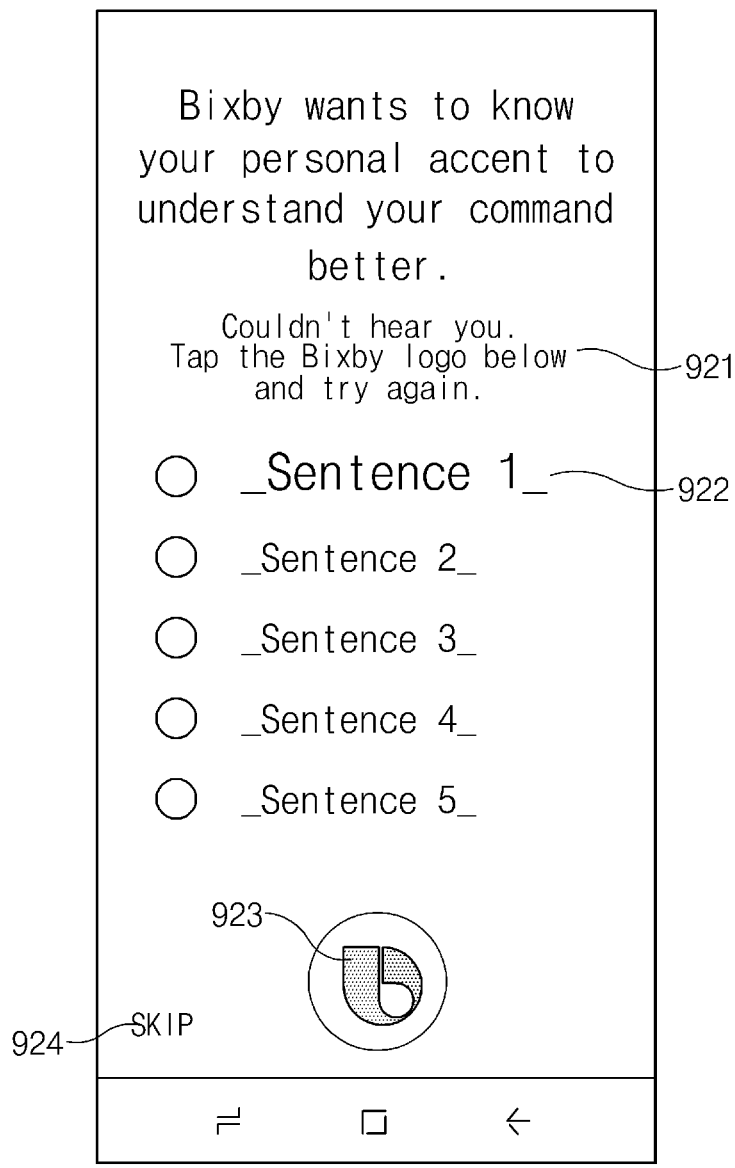
FIG. 9B is a view illustrating a screen that a user terminal displays when accuracy of ASR is lower than a critical value, according to an embodiment.

FIG. 9B is a view illustrating a screen that the user terminal 100 displays when accuracy of ASR is lower than a critical value, according to an embodiment.

FIG. 9B is a screen that may be displayed when operation 501 is performed after operation 507 (i.e. when the first response is received by the user terminal 100). In this case, the processor 150 of the user terminal 100 displays this screen because the accuracy of the ASR corresponding to the previously received user speech is lower than the critical value.

Referring to FIG. 9B, the processor 150 of the user terminal 100 may display, on the touchscreen display 120, a guide message 921 for guiding the user to enter a user input to select a first object, a first sample text 922 displayed to be visually different from other sample texts, a first object 923, and a second object 924.

In an embodiment, in the case where the accuracy is lower than the critical value, the processor 150 of the user terminal 100 may display the first object 923 as being deactivated again. The processor 150 of the user terminal 100 may further display the guide message 921 to guide the user to enter a user input to select the first object. Once selected, the user may speak the first sample text again.

Figure 9C:
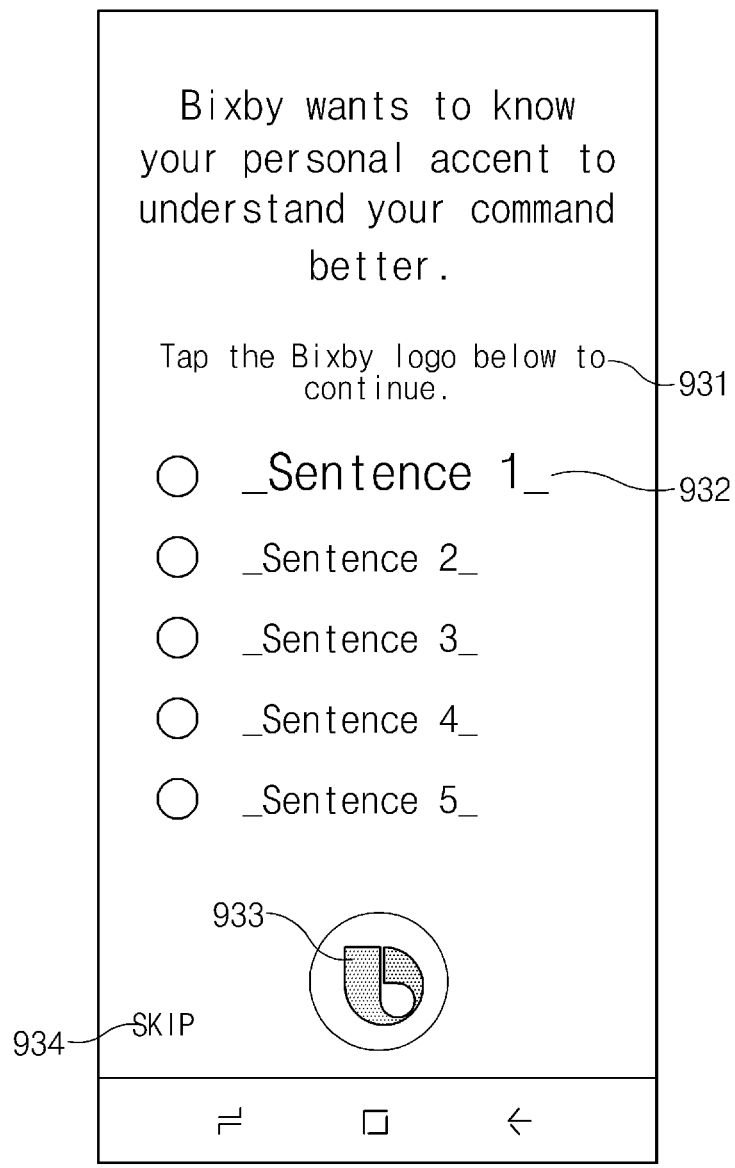
FIG. 9C is a view illustrating a screen that a user terminal displays when a standby time for receiving a user's speech exceeds a specified time period, according to an embodiment.

FIG. 9C is a view illustrating a screen that the user terminal 100 displays when a standby time for receiving the user's speech exceeds a specified time period, according to an embodiment.

FIG. 9C is a screen that may be displayed when a specified time period elapses after the processor 150 of the user terminal 100 has displayed a screen as illustrated in FIG. 9A on the touchscreen display 120.

Referring to FIG. 9C, the processor 150 of the user terminal 100 may display, on the touchscreen display 120, a guide message 931 for guiding the user to enter a user input to select a first object, a first sample text 932 displayed to be visually different from other sample texts, a first object 933, and a second object 934.

In an embodiment, when, in waiting for the user to enter speech, the processor 150 of the user terminal 100 has stood by for a time period greater than a specified time period, the processor 150 of the user terminal 100 may display the first object 933 as being deactivated again and may display the guide message 931 to guide the user to enter a user input to select the first object 933. Once selected, the user may speak the first sample text.

Figure 10:
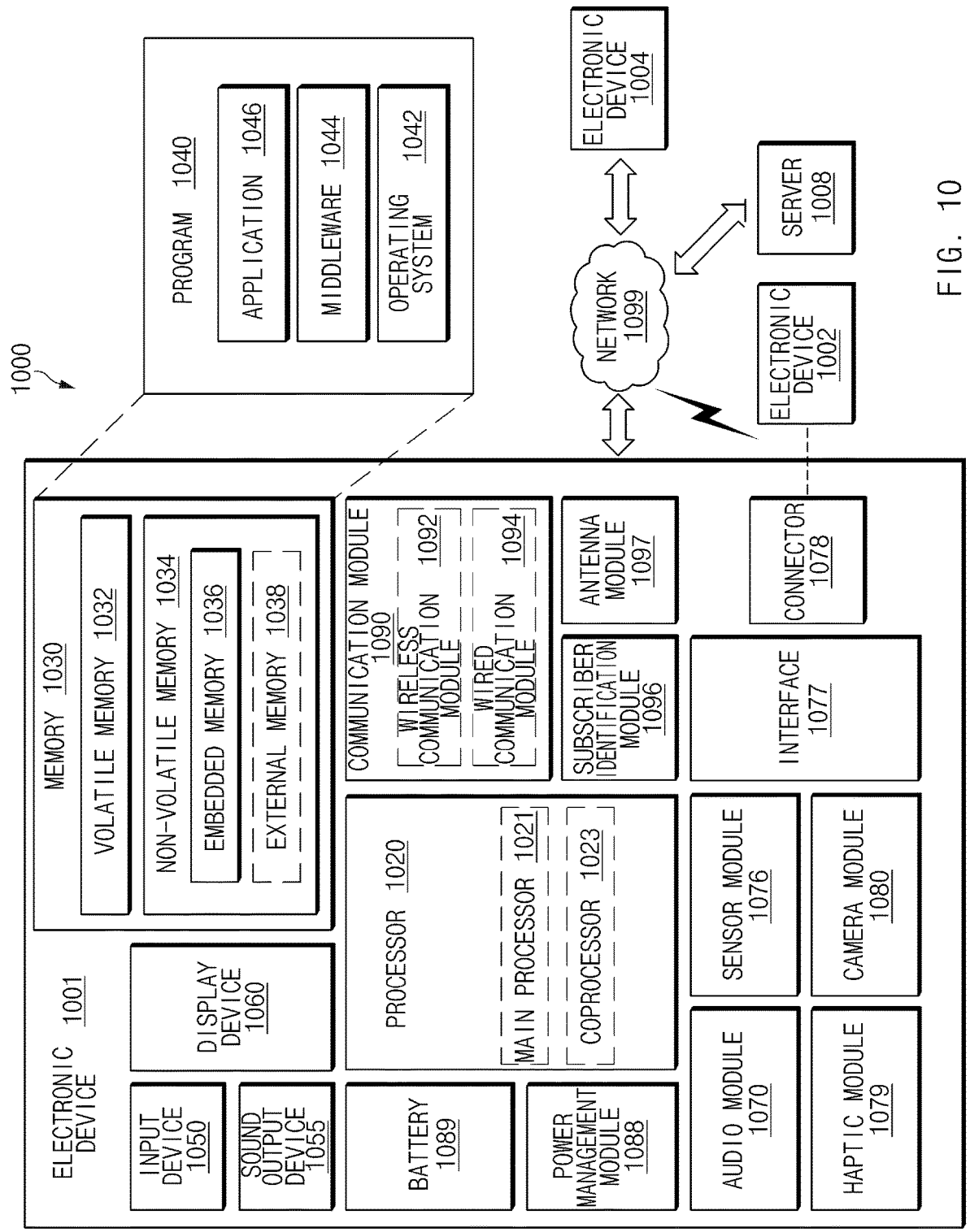
FIG. 10 is a block diagram of an electronic device in a network environment, according to an embodiment.

FIG. 10 is a block diagram of an electronic device 1001 in a network environment 1000 according to an embodiment. Referring to FIG. 10, the electronic device 1001 (e.g., the user terminal 100) may communicate with an electronic device 1002 through a first network 1098 (e.g., a short-range wireless communication) or may communicate with an electronic device 1004 or a server 1008 (e.g., the intelligence server 200) through a second network 1099 (e.g., a long-distance wireless communication) in the network environment 1000. According to an embodiment, the electronic device 1001 may communicate with the electronic device 1004 through the server 1008. According to an embodiment, the electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module 1096, and an antenna module 1097. According to some embodiments, at least one (e.g., the display device 1060 or the camera module 1080) among components of the electronic device 1001 may be omitted or other components may be added to the electronic device 1001. According to some embodiments, some components may be integrated and implemented as in the case of the sensor module 1076 (e.g., a fingerprint sensor, an iris sensor, or an illuminance sensor) embedded in the display device 1060 (e.g., a display).

The processor 1020 may operate, for example, software (e.g., a program 1040) to control at least one of other components (e.g., a hardware or software component) of the electronic device 1001 connected to the processor 1020 and may process and compute a variety of data. The processor 1020 may load a command set or data, which is received from other components (e.g., the sensor module 1076 or the communication module 1090), into a volatile memory 1032, may process the loaded command or data, and may store result data into a nonvolatile memory 1034. According to an embodiment, the processor 1020 may include a main processor 1021 (e.g., a central processing unit or an application processor) and a coprocessor 1023 (e.g., a graphic processing device, an image signal processor, a sensor hub processor, or a communication processor), which operates independently from the main processor 1021, additionally or alternatively uses less power than the main processor 1021, or is specified to a designated function. In this case, the coprocessor 1023 may operate separately from the main processor 1021 or embedded.

In this case, the coprocessor 1023 may control, for example, at least some of functions or states associated with at least one component (e.g., the display device 1060, the sensor module 1076, or the communication module 1090) among the components of the electronic device 1001 instead of the main processor 1021 while the main processor 1021 is in an inactive (e.g., sleep) state or together with the main processor 1021 while the main processor 1021 is in an active (e.g., an application execution) state. According to an embodiment, the coprocessor 1023 (e.g., the image signal processor or the communication processor) may be implemented as a part of another component (e.g., the camera module 1080 or the communication module 1090) that is functionally related to the coprocessor 1023. The memory 1030 may store a variety of data used by at least one component (e.g., the processor 1020 or the sensor module 1076) of the electronic device 1001, for example, software (e.g., the program 1040) and input data or output data with respect to commands associated with the software. The memory 1030 may include the volatile memory 1032 or the nonvolatile memory 1034.

The program 1040 may be stored in the memory 1030 as software and may include, for example, an operating system 1042, a middleware 1044, or an application 1046.

The input device 1050 may be a device for receiving a command or data, which is used for a component (e.g., the processor 1020) of the electronic device 1001, from an outside (e.g., a user) of the electronic device 1001 and may include, for example, a microphone (e.g., the microphone 111), a mouse, or a keyboard.

The sound output device 1055 may be a device for outputting a sound signal to the outside of the electronic device 1001 and may include, for example, a speaker used for general purposes, such as multimedia play or recordings play, and a receiver used only for receiving calls. According to an embodiment, the receiver and the speaker may be either integrally or separately implemented.

The display device 1060 may be a device for visually presenting information to the user and may include, for example, a display, a hologram device, or a projector and a control circuit for controlling a corresponding device. According to an embodiment, the display device 1060 may include a touch circuitry or a pressure sensor for measuring an intensity of pressure on the touch.

The audio module 1070 may convert a sound and an electrical signal in dual directions. According to an embodiment, the audio module 1070 may obtain the sound through the input device 1050 or may output the sound through an external electronic device (e.g., the electronic device 1002 (e.g., a speaker or a headphone)) wired or wirelessly connected to the sound output device 1055 or the electronic device 1001.

The sensor module 1076 may generate an electrical signal or a data value corresponding to an operating state (e.g., power or temperature) inside or an environmental state outside the electronic device 1001. The sensor module 1076 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1077 may support a designated protocol wired or wirelessly connected to the external electronic device (e.g., the electronic device 1002). According to an embodiment, the interface 1077 may include, for example, an HDMI (high-definition multimedia interface), a USB (universal serial bus) interface, an SD card interface, or an audio interface.

A connection terminal 1078 may include a connector that physically connects the electronic device 1001 to the external electronic device (e.g., the electronic device 1002), for example, an HDMI connector, a USB connector, an SD card connector, or an audio connector (e.g., a headphone connector).

The haptic module 1079 may convert an electrical signal to a mechanical stimulation (e.g., vibration or movement) or an electrical stimulation perceived by the user through tactile or kinesthetic sensations. The haptic module 1079 may include, for example, a motor, a piezoelectric element, or an electric stimulator.

The camera module 1080 may shoot a still image or a video image. According to an embodiment, the camera module 1080 may include, for example, at least one lens, an image sensor, an image signal processor, or a flash.

The power management module 1088 may be a module for managing power supplied to the electronic device 1001 and may serve as at least a part of a power management integrated circuit (PMIC).

The battery 1089 may be a device for supplying power to at least one component of the electronic device 1001 and may include, for example, a non-rechargeable (primary) battery, a rechargeable (secondary) battery, or a fuel cell.

The communication module 1090 may establish a wired or wireless communication channel between the electronic device 1001 and the external electronic device (e.g., the electronic device 1002, the electronic device 1004, or the server 1008) and support communication execution through the established communication channel. The communication module 1090 may include at least one communication processor operating independently from the processor 1020 (e.g., the application processor) and supporting the wired communication or the wireless communication. According to an embodiment, the communication module 1090 may include a wireless communication module 1092 (e.g., a cellular communication module, a short-range wireless communication module, or a GNSS (global navigation satellite system) communication module) (e.g., the communication module 160) or a wired communication module 1094 (e.g., an LAN (local area network) communication module or a power line communication module) and may communicate with the external electronic device using a corresponding communication module among them through the first network 1098 (e.g., the short-range communication network such as a Bluetooth, a Wi-Fi direct, or an IrDA (infrared data association)) or the second network 1099 (e.g., the long-distance wireless communication network such as a cellular network, an internet, or a computer network (e.g., LAN or WAN)). The above-mentioned various communication modules 1090 may be implemented into one chip or into separate chips, respectively.

According to an embodiment, the wireless communication module 1092 may identify and authenticate the electronic device 1001 using user information stored in the subscriber identification module 1096 in the communication network.

The antenna module 1097 may include one or more antennas to transmit or receive the signal or power to or from an external source. According to an embodiment, the communication module 1090 (e.g., the wireless communication module 1092) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1001 and the external electronic device 1004 through the server 1008 connected to the second network 1099. Each of the electronic devices 1002 and 1004 may be the same or different types as or from the electronic device 1001. According to an embodiment, all or some of the operations performed by the electronic device 1001 may be performed by another electronic device or a plurality of external electronic devices. When the electronic device 1001 performs some functions or services automatically or by request, the electronic device 1001 may request the external electronic device to perform at least some of the functions related to the functions or services, in addition to or instead of performing the functions or services by itself. The external electronic device receiving the request may carry out the requested function or the additional function and transmit the result to the electronic device 1001. The electronic device 1001 may provide the requested functions or services based on the received result as is or after additionally processing the received result. To this end, for example, a cloud computing, distributed computing, or client-server computing technology may be used.

According to an embodiment of the present disclosure, a system may include at least one network interface, at least one processor operatively connected to the network interface, and at least one memory operatively connected to the processor. The memory may store a plurality of language models of a first language. The plurality of language models may be different from one another. Each of the plurality of language models may be provided for speakers whose native language is different from the first language. The memory may further store instructions that, when executed, cause the processor to receive a user's speech data associated with a plurality of sample texts from an external electronic device displaying a user interface including the plurality of sample texts, where the plurality of sample texts includes words, phrases, and/or sentences, to perform automatic speech recognition (ASR) on the speech data, using the plurality of language models, to select the language model from the plurality of language models based on results from the performed ASR, and to use the selected one language models as a default language model for speech of the user.

In an embodiment, the external electronic device may be a mobile device that includes a touchscreen display, and the user interface may be displayed on the touchscreen display.

In an embodiment, the instructions may further cause the processor to determine scores for each of the plurality of language models based on the results from the ASR and to use the scores to select the one language model from the plurality of language models.

In an embodiment, the instructions may further cause the processor to weigh the scores by applying a weight to each of the scores, wherein the weight is based on at least one of a sample text and a language model corresponding to each of the scores, to determine recognition accuracy for each language model based on the weighted scores; and to use the recognition accuracy to select the one language model from the plurality of language models.

In an embodiment, the first language may be English, and the native language may include at least one of Korean, Chinese, Japanese, Hindi, French, British English, German, Spanish, Portuguese, and Russian.

In an embodiment, the instructions may further cause the processor to receive, from the external electronic device through the network interface, data of the user's first speech associated with a first sample text in the plurality of sample texts, to perform the ASR on the data of the user's first speech using the plurality of language models, to determine accuracy of the ASR based on the first sample text and the user's first speech, when the accuracy is less than a critical value, to transmit a first response to the external electronic device through the network interface, and to re-receive the data of the user's first speech from the external electronic device through the network interface, and when the accuracy is equal to or greater than the critical value, to transmit a second response to the external electronic device through the network interface, where the second response is different from the first response, and to receive, from the external electronic device through the network interface, data of the user's second speech associated with a second sample text in the plurality of sample texts, where the second sample text is different from the first sample text.

In an embodiment, the instructions may further cause the processor to receive personalization information of the user from the external electronic device through the network interface and to select the one language model from the plurality of language models based on the received personalization information and the results from the ASR.

In an embodiment, the instructions may further cause the processor to select one or more first language models from the plurality of language models based on the personalization information of the user, to select a second language model from the plurality of language models based on the results from the ASR, and when the second language model is included in the one or more first language models, to select the second language model as the default language model.

According to an embodiment of the present disclosure, an electronic device may include a housing, a touchscreen display disposed inside the housing and exposed through a first portion of the housing, a microphone disposed inside the housing and exposed through a second portion of the housing, a wireless communication circuit disposed inside the housing, a processor disposed inside the housing and operatively connected to the touchscreen display, the microphone, and the wireless communication circuit, and a memory disposed inside the housing and operatively connected to the processor. The memory may store a plurality of language models of a first language. The plurality of language models may be different from one another. Each of the plurality of language models may be provided for speakers whose native language is different from the first language. The memory further stores instructions that, when executed, cause the processor to display a plurality of sample texts on the touchscreen display, to receive, through the microphone, a plurality of a user's speeches each associated with one of the plurality of sample texts, to transmit data of the plurality of the user's speeches to an external server through the wireless communication circuit, to receive results from ASR performed on the data of the plurality of the user's speeches from the external server through the wireless communication circuit, to select one language model from the plurality of language models based on the received results from the ASR, and to use the selected one language model as a default language model for speech of the user.

In an embodiment, the instructions may further cause the processor to determine scores for each of the plurality of language models based on the results from the performed ASR and to use the scores to select the one language model from the plurality of language models.

In an embodiment, the instructions may further cause the processor to weigh the scores by applying a weight to each of the scores, wherein the weight is based on at least one of a sample text and a language model corresponding to each of the scores, to determine recognition accuracy for each language model based on the weighted scores, and to use the recognition accuracy to select the one language model from the plurality of language models.

In an embodiment, the instructions may further cause the processor to receive, through the microphone, data of the user's first speech associated with a first sample text in the plurality of sample texts, to perform the ASR on the data of the user's first speech using the plurality of language models, to determine accuracy of the ASR based on the first sample text and the user's first speech, when the accuracy is less than a critical value, to re-receive the user's first speech through the microphone, and when the accuracy is equal to or greater than the critical value, to receive, through the microphone, the user's second speech associated with a second sample text in the plurality of sample texts, where the second sample text is different from the first sample text.

In an embodiment, the memory may store personalization information of the user, and the instructions may further cause the processor to select the one language model from the plurality of language models based on the personalization information and the results from the ASR.

In an embodiment, the instructions may further cause the processor to select one or more first language models from the plurality of language models based on the personalization information of the user, to select a second language model from the plurality of language models based on the results from the ASR, and when the second language model is included in the one or more first language models, to select the second language model as the default language model.

According to an embodiment of the present disclosure, an electronic device may include a housing, a touchscreen display disposed inside the housing and exposed through a first portion of the housing, a microphone disposed inside the housing and exposed through a second portion of the housing, a wireless communication circuit disposed inside the housing, a processor disposed inside the housing and operatively connected to the touchscreen display, the microphone, and the wireless communication circuit, and a memory disposed inside the housing and operatively connected to the processor. The memory may store a plurality of language models of a first language. The plurality of language models may be different from one another. Each of the plurality of language models may be provided for speakers whose native language is different from the first language. The memory may further store instructions that, when executed, cause the processor to display a plurality of sample texts on the touchscreen display, to receive, through the microphone, a plurality of a user's speeches each associated with one of the plurality of sample texts, to transmit data of the plurality of the user's speeches to an external server through the wireless communication circuit, and to transmit the plurality of language models to the external server. After transmitting the data of the plurality of the user's speeches and the plurality of language models, the instructions may cause the external server to perform ASR on the data of the plurality of the user's speeches using the plurality of language models, to select one language model from the plurality of language models based on results from the ASR, and to use the selected one language model as a default language model for speech of the user.

In an embodiment, the memory may further store a plurality of text groups respectively corresponding to the plurality of language models, each of the plurality of text groups includes one or more sample texts, and the plurality of sample texts is selected from the plurality of text groups.

In an embodiment, the instructions may further cause the processor to display, on the touchscreen display, a first object for activating reception of the plurality of the user's speeches; and when a user input for selecting the first object is received through the touchscreen display, to receive the plurality of the user's speeches.

In an embodiment, the instructions may further cause the processor to receive, through the microphone. the user's first speech associated with a first sample text in the plurality of sample texts, to transmit data of the user's first speech to an external server through the wireless communication circuit, when a first response is received from the external server through the wireless communication circuit, to re-receive the user's first speech through the microphone, and when a second response different from the first response is received from the external server through the wireless communication circuit, to receive, through the microphone, the user's second speech associated with a second sample text in the plurality of sample texts, where the second sample text is different from the first sample text. The first response may correspond to accuracy of ASR on the user's first speech being less than a critical value, and the second response may correspond to the accuracy being equal to or greater than the critical value.

In an embodiment, the instructions may further cause the processor, when the second response is received, to display an indicator at a location corresponding to the first sample text.

In an embodiment, the instructions may further cause the processor to display, on the touchscreen display, a second object for skipping a setting of the default language model; and when a user input for selecting the second object is received through the touchscreen display, to allow the external server to select a preset language model as the default language model.

According to various embodiments of the present disclosure, a system may include at least one network interface, at least one processor operatively connected to the network interface, and at least one memory operatively connected to the processor. The memory may store a plurality of language models of a first language. The plurality of language models may be different from one another. Each of the plurality of language models may be provided for speakers whose native language is different from the first language. The memory may further store instructions that, when executed, cause the processor to provide a user interface including a plurality of samples including words, phrases, and/or sentences, to receive a user's speech data associated with the plurality of samples, to perform ASR on the speech data by using the plurality of language models, to select one language model from the plurality of language models based on the results from the ASR, and to use the selected language model as a default speech recognition model for speech of the user.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms of words may also include the plural thereof unless the context clearly indicates otherwise. In the present disclosure disclosed herein, the expressions "A or B," "at least one of A or/and B," "A, B, or C," or "one or more of A, B, or/and C," and the like used herein may include any and all combinations of one or more of the associated listed items. The expressions "a first," "a second," "the first," or "the second" used herein may refer to corresponding components without implying an order of importance, and are used merely to distinguish each component from the others without unduly limiting the components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic," "logical block," "part," or "circuit." The "module" may be an integrated part or may be a part thereof for performing one or more functions. For example, the "module" may include an application-specific integrated circuit (ASIC).

Various embodiments of the present disclosure may be implemented by software (e.g., the program 1040) including instructions stored in a machine-readable storage media (e.g., an internal memory 1036 or an external memory 1038) readable by a machine (e.g., a computer). The machine may be a device that calls the instructions from the machine-readable storage media and operates depending on the called instructions and may include the electronic device (e.g., the electronic device 1001). When the instructions are executed by the processor (e.g., the processor 1020), the processor may perform functions corresponding to the instructions directly or using other components under the control of the processor. The instruction may include code made by a compiler or code executable by an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a touchscreen;
    a microphone;
    a wireless communication circuit;
    a processor operatively connected to the touchscreen display, the microphone, and the wireless communication circuit; and
    a memory operatively connected to the processor, wherein the memory stores a plurality of language models of a first language, wherein the plurality of language models are different from one another, and each of the plurality of language models is provided for speakers whose native language is different from the first language, wherein the memory further stores instructions that, when executed, cause the processor to:
        display a plurality of sample texts on the touchscreen display;
        receive, through the microphone, a plurality of a user's speeches each associated with one of the plurality of sample texts;
        transmit data of the plurality of the user's speeches to an external server through the wireless communication circuit;
        receive results from ASR performed on the data of the plurality of the user's speeches from the external server through the wireless communication circuit;
        select one language model from the plurality of language models based on the received results from the ASR; and
        use the selected language model as a default language model for speech of the user, and
    wherein the instructions further cause the processor to:
        display, on the touchscreen display, an object for skipping a setting of the default language model; and
        when a user input for selecting the object is received through the touchscreen display, allow the external server to select a preset language model as the default language model.

2. The electronic device of claim 1, wherein the instructions further cause the processor to:
    determine scores for each of the plurality of language models based on the results from the ASR; and
    use the scores to select the one language model from the plurality of language models.

3. The electronic device of claim 2, wherein the instructions further cause the processor to:
    weigh the scores by applying a weight to each of the scores, wherein the weight is based on at least one of a sample text and a language model corresponding to each of the scores;
    determine recognition accuracy for each language model based on the weighted scores; and
    use the recognition accuracy to select the one language model from the plurality of language models.

4. The electronic device of claim 1, wherein the instructions further cause the processor to:
    receive, through the microphone, data of the user's first speech associated with a first sample text in the plurality of sample texts;
    perform the ASR on the data of the user's first speech using the plurality of language models;
    determine accuracy of the ASR based on the first sample text and the user's first speech;
    when the accuracy is less than a critical value, re-receive the user's first speech through the microphone; and
    when the accuracy is equal to or greater than the critical value, receive, through the microphone, the user's second speech associated with a second sample text in the plurality of sample texts, wherein the second sample text is different from the first sample text.

5. The electronic device of claim 1, wherein the memory stores personalization information of the user, and
    wherein the instructions further cause the processor to:
    select the one language model from the plurality of language models based on the personalization information and the results from the ASR.

6. The electronic device of claim 5, wherein the instructions further cause the processor to:
    select one or more first language models from the plurality of language models based on the personalization information of the user;
    select a second language model from the plurality of language models based on the results from the ASR; and
    when the second language model is included in the one or more first language models, select the second language model as the default language model.

7. An electronic device comprising:
    a touchscreen display;
    a microphone;
    a wireless communication circuit;
    a processor operatively connected to the touchscreen display, the microphone, and the wireless communication circuit; and
    a memory operatively connected to the processor, wherein the memory stores a plurality of language models of a first language, wherein the plurality of language models are different from one another, and each of the plurality of language models is provided for speakers whose native language is different from the first language, wherein the memory further stores instructions that, when executed, cause the processor to:
    display a plurality of sample texts on the touchscreen display;
    receive, through the microphone, a plurality of a user's speeches each associated with one of the plurality of sample texts; and
    transmit data of the plurality of the user's speeches to an external server through the wireless communication circuit, and
    wherein transmitting the data of the plurality of the user's speeches causes the external server to:
    perform ASR on the data of the plurality of the user's speeches using the plurality of language models;
    select one language model from the plurality of language models based on results from the ASR; and
    use the selected one language model as a default language model for speech of the user,
    wherein the external server stores the plurality of language models, and
    wherein the instructions further cause the processor to:
    display, on the touchscreen display, a first object for skipping a setting of the default language model; and
    when a user input for selecting the first object is received through the touchscreen display, allow the external server to select a preset language model as the default language model.

8. The electronic device of claim 7, wherein the memory further stores a plurality of text groups respectively corresponding to the plurality of language models,
    wherein each of the plurality of text groups includes one or more sample texts, and
    wherein the plurality of sample texts is selected from the plurality of text groups.

9. The electronic device of claim 7, wherein the instructions further cause the processor to:
    display, on the touchscreen display, a second object for activating reception of the plurality of the user's speeches; and
    when a user input for selecting the second object is received through the touchscreen display, receive the plurality of the user's speeches.

10. The electronic device of claim 7, wherein the instructions further cause the processor to:
    receive, through the microphone, the user's first speech associated with a first sample text in the plurality of sample texts;
    transmit data of the user's first speech to an external server through the wireless communication circuit;
    when a first response from the external server is received through the wireless communication circuit, re-receive the user's first speech through the microphone; and
    when a second response different from the first response is received from the external server through the wireless communication circuit, receive, through the microphone, the user's second speech associated with a second sample text in the plurality of sample texts, wherein the second sample text is different from the first sample text,
    wherein the first response corresponds to accuracy of ASR on the user's first speech being less than a critical value, and
    wherein the second response corresponds to the accuracy being equal to or greater than the critical value.

11. The electronic device of claim 10, wherein the instructions further cause the processor to:
    when the second response is received, display an indicator at a location corresponding to the first sample text.

* * * * *